(12) United States Patent
Sun et al.

(10) Patent No.: US 10,813,119 B2
(45) Date of Patent: Oct. 20, 2020

(54) UPLINK CONTROL INFORMATION SENDING AND RECEIVING METHOD AND APPARATUS

(71) Applicant: HUAWEI TECHNOLOGIES CO., LTD., Shenzhen, Guangdong (CN)

(72) Inventors: Hao Sun, Beijing (CN); Lixia Xue, Beijing (CN); Fan Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/713,375

(22) Filed: Dec. 13, 2019

(65) Prior Publication Data

US 2020/0120706 A1  Apr. 16, 2020

Related U.S. Application Data

(63) Continuation of application No. PCT/CN2019/081541, filed on Apr. 4, 2019.

(30) Foreign Application Priority Data

Apr. 4, 2018  (CN) .......................... 2018 1 0302333

(51) Int. Cl.
*H04B 7/00* (2006.01)
*H04W 72/12* (2009.01)
(Continued)

(52) U.S. Cl.
CPC ...... *H04W 72/1284* (2013.01); *H04B 7/0626* (2013.01); *H04L 1/1812* (2013.01); *H04L 5/0007* (2013.01); *H04W 76/27* (2018.02)

(58) Field of Classification Search
CPC ............ H04W 72/02; H04W 72/0446; H04W 72/048; H04W 72/1257; H04W 72/1268
(Continued)

(56) References Cited

U.S. PATENT DOCUMENTS 9,054,846 B2 *   6/2015  Falahati ................ H04L 5/0055
10,158,461 B2 * 12/2018  Li ......................... H04L 5/0055
(Continued)

FOREIGN PATENT DOCUMENTS

CN      104936300 A     9/2015
CN      105900503 A     8/2016
(Continued)

OTHER PUBLICATIONS

Ericsson, "On UCI Multiplexing on PUCCH," 3GPP TSG RAN WG1 Meeting #92, R1-1802906; Athens, Greece, Feb. 26-Mar. 2, 2018, 10 pages.
(Continued)

*Primary Examiner* — Dmitry Levitan
(74) *Attorney, Agent, or Firm* — Fish & Richardson P.C.

(57) ABSTRACT

A terminal device receives first information including an acknowledgment resource indicator (ARI), and determines, based on the ARI, a first uplink control channel (PUCCH) resource in a PUCCH resource set corresponding to a payload size of a hybrid automatic repeat request acknowledgment (HARQ-ACK). In a case that the first PUCCH resource and a second PUCCH resource partially overlap in terms of time; or the first PUCCH resource and a second PUCCH resource configured for CSI do not overlap in terms of time, and the first PUCCH resource and the second PUCCH resource each partially overlap at least one third PUCCH resource configured for at least one positive scheduling request (SR) in terms of time, the terminal device determines, based on the ARI, a fourth PUCCH resource in a second PUCCH resource set corresponding to a total payload size for sending the HARQ-ACK, CSI, and at least one SR status.

21 Claims, 10 Drawing Sheets

(51) Int. Cl.
*H04W 76/27* (2018.01)
*H04B 7/06* (2006.01)
*H04L 1/18* (2006.01)
*H04L 5/00* (2006.01)

(58) Field of Classification Search
USPC .................................... 370/310, 328, 329
See application file for complete search history.

(56) References Cited

U.S. PATENT DOCUMENTS

| | | | | |
|---|---|---|---|---|
| 10,182,467 | B2* | 1/2019 | Park | H04L 5/0053 |
| 10,499,384 | B2* | 12/2019 | He | H04W 52/325 |
| 10,568,075 | B2* | 2/2020 | Yan | H04L 5/0057 |
| 2014/0192738 | A1 | 7/2014 | Nam et al. | |
| 2016/0165592 | A1 | 6/2016 | Han et al. | |
| 2016/0337089 | A1* | 11/2016 | Chen | H04L 1/1854 |
| 2017/0303289 | A1 | 10/2017 | Guo et al. | |
| 2017/0325258 | A1* | 11/2017 | Nogami | H04J 11/00 |
| 2018/0054280 | A1* | 2/2018 | Fu | H04B 7/0621 |
| 2018/0352545 | A1* | 12/2018 | Takeda | H04L 5/0055 |
| 2019/0089512 | A1 | 3/2019 | Papasakellariou et al. | |
| 2019/0223205 | A1* | 7/2019 | Papasakellariou | H04L 5/00 |
| 2019/0261361 | A1* | 8/2019 | Xiong | H04L 1/1812 |
| 2019/0261391 | A1* | 8/2019 | Kundu | H04L 25/0226 |
| 2019/0306922 | A1* | 10/2019 | Xiong | H04W 72/0446 |
| 2019/0380124 | A1* | 12/2019 | Kim | H04L 1/0068 |
| 2020/0120706 | A1* | 4/2020 | Sun | H04W 76/27 |
| 2020/0153541 | A1* | 5/2020 | Faxer | H04L 5/0055 |

FOREIGN PATENT DOCUMENTS

| | | |
|---|---|---|
| CN | 106060930 A | 10/2016 |
| CN | 107210794 A | 9/2017 |

OTHER PUBLICATIONS

3GPP TS 38.212 V15.0.0 (Dec. 2017), "3rd Generation Partnership Project; Technical Specification Group Radio Access Network; NR; Multiplexing and channel coding (Release 15)," Dec. 2017, 82 pages.

3GPP TS 38.213 V15.0.0 (Dec. 2017), 3rd Generation Partnership Project; Technical Specification Group Radio Access Network; NR; Physical layer procedures for control (Release 15), Dec. 2017, 56 pages.

Office Action issued in Chinese Application No. 201810302333.8 dated May 8, 2020, 13 pages (with English translation).

Office Action issued in Chinese Application No. 201980001544.0 dated Apr. 2, 2020, 18 pages (with English translation).

* cited by examiner

UPLINK CONTROL INFORMATION SENDING AND RECEIVING METHOD AND APPARATUS

CROSS-REFERENCE TO RELATED APPLICATIONS

This application is a continuation of International Application No. PCT/CN2019/081541, filed on Apr. 4, 2019, which claims priority to Chinese Patent Application No. 201810302333.8, filed on Apr. 4, 2018. The disclosures of the aforementioned applications are hereby incorporated by reference in their entireties.

TECHNICAL FIELD

This application relates to the field of wireless communication technologies, and in particular, to an uplink control information sending and receiving method and apparatus.

BACKGROUND

In a fifth generation (5G) mobile communication system, physical uplink control channels (PUCCH) are sent in a slot. In the slot, both a start orthogonal frequency division multiplexing (OFDM) symbol of the PUCCH and a quantity of OFDM symbols occupied by the PUCCH may be flexibly configured. Therefore, in an actual running process of the system, OFDM symbols occupied by three different types of uplink control information (UCI) in a same slot may partially overlap. As shown in FIG. 1, OFDM symbols occupied by channel state information (CSI), OFDM symbols occupied by a scheduling request (SR), and OFDM symbols occupied by a hybrid automatic repeat request acknowledgment (HARQ-ACK) partially overlap.

To enable a terminal device to keep a single-carrier characteristic of uplink sending (in other words, to keep a relatively low peak to average power ratio (PAPR)), and to ensure that UCI can be correctly received by a network device, only one piece of UCI can be sent on any OFDM symbol, and a sending manner in which a PUCCH channel is directly truncated cannot be used. Therefore, a problem of how to send three different types of UCI when OFDM symbols occupied by the three different types of UCI in a same slot partially overlap needs to be resolved.

SUMMARY

Embodiments of this application provide an uplink control information sending and receiving method and apparatus, to resolve a problem of how to send three different types of UCI when OFDM symbols occupied by the three different types of UCI in a same slot partially overlap in the prior art.

According to a first aspect, an embodiment of this application provides an uplink control information sending method, and the method includes: receiving first information from a network device, where the first information indicates a first uplink control channel PUCCH resource, and the first PUCCH resource is used to transmit a HARQ-ACK; where a second PUCCH resource and the first PUCCH resource partially overlap in terms of time; or a second PUCCH resource and the first PUCCH resource do not overlap in terms of time, and any third PUCCH resource in at least one third PUCCH resource respectively partially overlaps the first PUCCH resource and the second PUCCH resource in terms of time; where the second PUCCH resource is used to transmit CSI, the at least one third PUCCH resource is used to transmit at least one positive SR, and one third PUCCH resource in the at least one third PUCCH resource is used to transmit one positive SR; and transmitting at least one SR status, the CSI, and the HARQ-ACK to the network device on the first PUCCH resource, where the SR status is a positive SR or a negative SR.

Therefore, according to the method provided in this embodiment of this application, a problem of how to send three different types of UCI when OFDM symbols occupied by the three different types of UCI in a same slot partially overlap can be resolved, so that a single-carrier characteristic of uplink sending of a terminal device can be kept, and it is ensured that the UCI can be correctly received by the network device.

In a possible design, the second PUCCH resource is a PUCCH resource used to transmit one piece of periodic CSI, or is a PUCCH resource used to transmit a plurality of pieces of periodic CSI.

Therefore, the second PUCCH resource may be a PUCCH resource in a plurality of forms.

In a possible design, the first information further indicates that a PUCCH format used to transmit the HARQ-ACK is PUCCH format 2; and before the transmitting at least one SR status, the CSI, and the HARQ-ACK, the method further includes: jointly encoding the at least one SR status, the CSI, and the HARQ-ACK.

Therefore, the terminal device may determine a proper encoding mode based on the PUCCH format.

In a possible design, the first information further indicates that a PUCCH format used to transmit the HARQ-ACK is PUCCH format 3 or PUCCH format 4; and before the at least one SR status, the CSI, and the HARQ-ACK are transmitted, the at least one SR status, the HARQ-ACK, and a first part CSI part 1 in the CSI are jointly encoded, and a second part CSI part 2 in the CSI is independently encoded.

Therefore, the terminal device may determine a proper encoding mode based on the PUCCH format.

In a possible design, when a quantity of the at least one third PUCCH resource is K, where K is an integer greater than or equal to 2, a quantity of bits occupied by the at least one SR status is $\lceil \log_2(K+1) \rceil$.

Therefore, according to the foregoing method, it can be ensured that the at least one SR status can be accurately indicated.

In a possible design, the first information includes an acknowledgment resource indicator ARI field; before the at least one SR status, the CSI, and the HARQ-ACK are transmitted, a total payload size is determined based on a payload size of the at least one SR status, a payload size of the CSI, and a payload size of the HARQ-ACK; and a PUCCH resource set corresponding to the total payload size is determined based on the total payload size, and a PUCCH resource in the PUCCH resource set is determined as the first PUCCH resource based on the ARI field.

Therefore, the terminal device may determine, based on the ARI field, the first PUCCH resource configured by the network device.

According to a second aspect, an embodiment of this application provides an uplink control information receiving method, and the method includes: sending first information to a terminal device, where the first information indicates a first PUCCH resource, and the first PUCCH resource is used to transmit a HARQ-ACK; where a second PUCCH resource and the first PUCCH resource partially overlap in terms of time; or a second PUCCH resource and the first PUCCH resource do not overlap in terms of time, and any third PUCCH resource in at least one third PUCCH resource respectively partially overlaps the first PUCCH resource and the second PUCCH resource in terms of time; where the at least one third PUCCH resource is used to transmit at least one positive SR, and one third PUCCH resource in the at least one third PUCCH resource is used to transmit one positive SR; and receiving, on the first PUCCH resource, at least one SR status, the CSI, and the HARQ-ACK that are transmitted by the terminal device, where the SR status is a positive SR or a negative SR.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2, PUCCH format 3, or PUCCH format 4.

In a possible design, when a quantity of the at least one third PUCCH resource is K, where K is an integer greater than or equal to 2, a quantity of bits occupied by the at least one SR status is $\lceil \log_2(K+1) \rceil$.

In a possible design, the sending first information to a terminal device includes: determining a total payload size based on a payload size of the at least one SR status, a payload size of the CSI, and a payload size of the HARQ-ACK; determining, based on the total payload size, a PUCCH resource set corresponding to the total payload size, and selecting a PUCCH resource from the PUCCH resource set as the first PUCCH resource; and sending the first information to the terminal device, where the first information includes an ARI field, and the ARI field is an ARI field corresponding to the selected PUCCH resource.

According to a third aspect, an embodiment of this application provides an uplink control information sending method, and the method includes: receiving first information from a network device, where the first information indicates a first uplink control channel PUCCH resource, and the first PUCCH resource is used to transmit a HARQ-ACK; where a second PUCCH resource and the first PUCCH resource partially overlap in terms of time, and at least one third PUCCH resource does not overlap the first PUCCH resource in terms of time; where the second PUCCH resource is used to transmit CSI, the at least one third PUCCH resource is used to transmit at least one positive SR, and one third PUCCH resource in the at least one third PUCCH resource is used to transmit one positive SR; and transmitting the HARQ-ACK and the CSI to the network device on the first PUCCH resource, and transmitting the at least one positive SR on the at least one third PUCCH resource.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2; and before the transmitting the CSI and the HARQ-ACK, the method further includes: jointly encoding the CSI and the HARQ-ACK.

In a possible design, the first information further indicates that a PUCCH format used to transmit the HARQ-ACK is PUCCH format 3 or PUCCH format 4; and before the at least one SR status, the CSI, and the HARQ-ACK are transmitted, the HARQ-ACK and a first part CSI part 1 in the CSI are jointly encoded, and a second part CSI part 2 in the CSI is independently encoded.

In a possible design, the first information includes an acknowledgment resource indicator ARI field; before the CSI and the HARQ-ACK are transmitted, a total payload size is determined based on a payload size of the CSI and a payload size of the HARQ-ACK; and a PUCCH resource set corresponding to the total payload size is determined based on the total payload size, and a PUCCH resource in the PUCCH resource set is determined as the first PUCCH resource based on the ARI field.

According to a fourth aspect, an embodiment of this application provides an uplink control information receiving method, and the method includes: sending first information to a terminal device, where the first information indicates a first PUCCH resource, and the first PUCCH resource is used to transmit a HARQ-ACK; where a second PUCCH resource and the first PUCCH resource partially overlap in terms of time, and at least one third PUCCH resource does not overlap the first PUCCH resource in terms of time; where the second PUCCH resource is used to transmit CSI, the at least one third PUCCH resource is used to transmit at least one positive SR, and one third PUCCH resource in the at least one third PUCCH resource is used to transmit one positive SR; and receiving, on the first PUCCH resource, the CSI and the HARQ-ACK that are transmitted by the terminal device, and receiving, on the at least one third PUCCH resource, the at least one positive SR transmitted by the terminal device.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2, PUCCH format 3, or PUCCH format 4.

In a possible design, the sending first information to a terminal device includes: determining a total payload size based on a payload size of the CSI and a payload size of the HARQ-ACK; determining, based on the total payload size, a PUCCH resource set corresponding to the total payload size, and selecting a PUCCH resource from the PUCCH resource set as the first PUCCH resource; and sending the first information to the terminal device, where the first information includes an ARI field, and the ARI field is an ARI field corresponding to the selected PUCCH resource.

According to a fifth aspect, an embodiment of this application provides an uplink control information sending method, and the method includes: receiving first information from a network device, where the first information indicates a first uplink control channel PUCCH resource, and the first PUCCH resource is used to transmit a HARQ-ACK; where a second PUCCH resource and the first PUCCH resource do not overlap in terms of time, and any third PUCCH resource in at least one third PUCCH resource respectively partially overlaps the first PUCCH resource and the second PUCCH resource in terms of time; where the second PUCCH resource is used to transmit CSI, the at least one third PUCCH resource is used to transmit at least one positive SR, and one third PUCCH resource in the at least one third PUCCH resource is used to transmit one positive SR; and transmitting the HARQ-ACK to the network device on the first PUCCH resource, and transmitting the CSI and at least one SR status to the network device on the second PUCCH resource.

In a possible design, the second PUCCH resource is a PUCCH resource used to transmit one piece of periodic CSI, or is a PUCCH resource used to transmit a plurality of pieces of periodic CSI.

In a possible design, when a quantity of the at least one third PUCCH resource is K, where K is an integer greater than or equal to 2, a quantity of bits occupied by the at least one SR status is $\lceil \log_2(K+1) \rceil$.

According to a sixth aspect, an embodiment of this application provides an uplink control information receiving method, and the method includes: sending first information to a terminal device, where the first information indicates a first PUCCH resource, and the first PUCCH resource is used to transmit a HARQ-ACK; where a second PUCCH resource and the first PUCCH resource do not overlap in terms of time, and any third PUCCH resource in at least one third PUCCH resource respectively partially overlaps the first PUCCH resource and the second PUCCH resource in terms of time; where the second PUCCH resource is used to transmit CSI, the at least one third PUCCH resource is used to transmit at least one positive SR, and one third PUCCH resource in the at least one third PUCCH resource is used to transmit one positive SR; and receiving, on the first PUCCH resource, the HARQ-ACK transmitted by the terminal device, and receiving, on the second PUCCH resource, the CSI and at least one SR status that are transmitted by the terminal device. In a possible design, the second PUCCH resource is a PUCCH resource used to transmit one piece of periodic CSI, or is a PUCCH resource used to transmit a plurality of pieces of periodic CSI.

According to a seventh aspect, an embodiment of this application provides an uplink control information sending method, and the method includes: receiving first information from a network device, where the first information indicates a first PUCCH resource, the first PUCCH resource is used to transmit a HARQ-ACK, and the first information includes an ARI field; where the first PUCCH resource is determined based on a total payload size and the ARI field, and the total payload size is a sum of a payload size of at least one SR status, a payload size of CSI, and a payload size of the HARQ-ACK; a fourth PUCCH resource is determined based on the payload size of the HARQ-ACK and the ARI field; the first PUCCH resource belongs to a first PUCCH resource set, and the fourth PUCCH resource belongs to a second PUCCH resource set; and a second PUCCH resource and the fourth PUCCH resource partially overlap in terms of time; or a second PUCCH resource and the fourth PUCCH resource do not overlap in terms of time, and any third PUCCH resource in at least one third PUCCH resource respectively partially overlaps the fourth PUCCH resource and the second PUCCH resource in terms of time; where the second PUCCH resource is used to transmit the CSI, the at least one third PUCCH resource is used to transmit at least one positive SR, and one third PUCCH resource in the at least one third PUCCH resource is used to transmit one positive SR; and transmitting the at least one SR status, the CSI, and the HARQ-ACK to the network device on the first PUCCH resource, where the SR status is a positive SR or a negative SR.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2; and before the transmitting the at least one SR status, the CSI, and the HARQ-ACK, the method further includes: jointly encoding the at least one SR status, the CSI, and the HARQ-ACK.

In a possible design, the first information further indicates that a PUCCH format used to transmit the HARQ-ACK is PUCCH format 3 or PUCCH format 4; and before the at least one SR status, the CSI, and the HARQ-ACK are transmitted, the at least one SR status, the HARQ-ACK, and a first part CSI part 1 in the CSI are jointly encoded, and a second part CSI part 2 in the CSI is independently encoded.

In a possible design, when a quantity of the at least one third PUCCH resource is K, where K is an integer greater than or equal to 2, a quantity of bits occupied by the at least one SR status is $\lceil \log_2(K+1) \rceil$.

In a possible design, a start symbol of the first PUCCH resource is the same as a start symbol of the fourth PUCCH resource, or an end symbol of the first PUCCH resource is the same as an end symbol of the fourth PUCCH resource.

According to an eighth aspect, an embodiment of this application provides an uplink control information receiving method, and the method includes: sending first information to a terminal device, where the first information indicates a first PUCCH resource, the first PUCCH resource is used to transmit a HARQ-ACK, and the first information includes an ARI field; where the first PUCCH resource is determined based on a total payload size and the ARI field, and the total payload size is a sum of a payload size of at least one SR status, a payload size of CSI, and a payload size of the HARQ-ACK; a fourth PUCCH resource is determined based on the payload size of the HARQ-ACK and the ARI field; the first PUCCH resource belongs to a first PUCCH resource set, and the fourth PUCCH resource belongs to a second PUCCH resource set; and a second PUCCH resource and the fourth PUCCH resource partially overlap in terms of time; or a second PUCCH resource and the fourth PUCCH resource do not overlap in terms of time, and any third PUCCH resource in at least one third PUCCH resource respectively partially overlaps the fourth PUCCH resource and the second PUCCH resource in terms of time; where the second PUCCH resource is used to transmit the CSI, the at least one third PUCCH resource is used to transmit at least one positive SR, and one third PUCCH resource in the at least one third PUCCH resource is used to transmit one positive SR; and receiving, on the first PUCCH resource, the at least one SR status, the CSI, and the HARQ-ACK that are transmitted by the terminal device, where the SR status is a positive SR or a negative SR.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2, PUCCH format 3, or PUCCH format 4.

In a possible design, when a quantity of the at least one third PUCCH resource is K, where K is an integer greater than or equal to 2, a quantity of bits occupied by the at least one SR status is $\lceil \log_2(K+1) \rceil$.

In a possible design, the sending first information to a terminal device includes: determining the total payload size based on the payload size of the at least one SR status, the payload size of the CSI, and the payload size of the HARQ-ACK; determining, based on the total payload size, a PUCCH resource set corresponding to the total payload size, and selecting a PUCCH resource from the PUCCH resource set as the first PUCCH resource; and sending the first information to the terminal device, where the first information includes the ARI field, and the ARI field is an ARI field corresponding to the selected PUCCH resource.

According to a ninth aspect, an embodiment of this application provides an uplink control information sending method, and the method includes: receiving first information from a network device, where the first information indicates a first PUCCH resource, the first PUCCH resource is used to transmit a HARQ-ACK, and the first information includes an ARI field; where the first PUCCH resource is determined based on a total payload size and the ARI field, and the total payload size is a sum of a payload size of CSI and a payload size of the HARQ-ACK; a fourth PUCCH resource is determined based on the payload size of the HARQ-ACK and the ARI field; the first PUCCH resource belongs to a first PUCCH resource set, and the fourth PUCCH resource belongs to a second PUCCH resource set; and a second PUCCH resource and the fourth PUCCH resource partially overlap in terms of time, and the second PUCCH resource is used to transmit the CSI; and transmitting the CSI and the HARQ-ACK to the network device on the first PUCCH resource.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2; and before the transmitting the CSI and the HARQ-ACK, the method further includes: jointly encoding the CSI and the HARQ-ACK.

In a possible design, the first information further indicates that a PUCCH format used to transmit the HARQ-ACK is PUCCH format 3 or PUCCH format 4; and before the at least one SR status, the CSI, and the HARQ-ACK are transmitted, the HARQ-ACK and a first part CSI part 1 in the CSI are jointly encoded, and a second part CSI part 2 in the CSI is independently encoded.

In a possible design, a start symbol of the first PUCCH resource is the same as a start symbol of the fourth PUCCH resource, or an end symbol of the first PUCCH resource is the same as an end symbol of the fourth PUCCH resource.

According to a tenth aspect, an embodiment of this application provides an uplink control information receiving method, and the method includes: sending first information to a terminal device, where the first information indicates a first PUCCH resource, the first PUCCH resource is used to transmit a HARQ-ACK, and the first information includes an ARI field; where the first PUCCH resource is determined based on a total payload size and the ARI field, and the total payload size is a sum of a payload size of CSI and a payload size of the HARQ-ACK; a fourth PUCCH resource is determined based on the payload size of the HARQ-ACK and the ARI field; the first PUCCH resource belongs to a first PUCCH resource set, and the fourth PUCCH resource belongs to a second PUCCH resource set; and a second PUCCH resource and the fourth PUCCH resource partially overlap in terms of time, and the second PUCCH resource is used to transmit the CSI; and receiving, on the first PUCCH resource, the CSI and the HARQ-ACK that are transmitted by the terminal device.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2, PUCCH format 3, or PUCCH format 4.

In a possible design, a start symbol of the first PUCCH resource is the same as a start symbol of the fourth PUCCH resource, or an end symbol of the first PUCCH resource is the same as an end symbol of the fourth PUCCH resource.

According to an eleventh aspect, an embodiment of this application provides an uplink control information sending method, and the method includes: receiving first information from a network device, where the first information indicates a first PUCCH resource, the first PUCCH resource is used to transmit a HARQ-ACK, and the first information includes an ARI field; where the first PUCCH resource is determined based on a total payload size and the ARI field, and the total payload size is a sum of a payload size of CSI and a payload size of the HARQ-ACK; a fourth PUCCH resource is determined based on the payload size of the HARQ-ACK and the ARI field; the first PUCCH resource belongs to a first PUCCH resource set, and the fourth PUCCH resource belongs to a second PUCCH resource set; and a second PUCCH resource and the fourth PUCCH resource partially overlap in terms of time, and at least one third PUCCH resource and the fourth PUCCH resource do not overlap in terms of time; where the second PUCCH resource is used to transmit the CSI, the at least one third PUCCH resource is used to transmit at least one positive SR, and one third PUCCH resource in the at least one third PUCCH resource is used to transmit one positive SR; and transmitting the HARQ-ACK and the CSI to the network device on the first PUCCH resource, and transmitting the at least one positive SR on the at least one third PUCCH resource.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2; and before the transmitting the CSI and the HARQ-ACK, the method further includes: jointly encoding the CSI and the HARQ-ACK.

In a possible design, the first information further indicates that a PUCCH format used to transmit the HARQ-ACK is PUCCH format 3 or PUCCH format 4; and before the at least one SR status, the CSI, and the HARQ-ACK are transmitted, the HARQ-ACK and a first part CSI part 1 in the CSI are jointly encoded, and a second part CSI part 2 in the CSI is independently encoded.

In a possible design, a start symbol of the first PUCCH resource is the same as a start symbol of the fourth PUCCH resource, or an end symbol of the first PUCCH resource is the same as an end symbol of the fourth PUCCH resource.

According to a twelfth aspect, an embodiment of this application provides an uplink control information receiving method, and the method includes: sending first information to a terminal device, where the first information indicates a first PUCCH resource, the first PUCCH resource is used to transmit a HARQ-ACK, and the first information includes an ARI field; where the first PUCCH resource is determined based on a total payload size and the ARI field, and the total payload size is a sum of a payload size of CSI and a payload size of the HARQ-ACK; a fourth PUCCH resource is determined based on the payload size of the HARQ-ACK and the ARI field; the first PUCCH resource belongs to a first PUCCH resource set, and the fourth PUCCH resource belongs to a second PUCCH resource set; and a second PUCCH resource and the fourth PUCCH resource partially overlap in terms of time, and at least one third PUCCH resource and the fourth PUCCH resource do not overlap in terms of time; where the second PUCCH resource is used to transmit the CSI, the at least one third PUCCH resource is used to transmit at least one positive SR, and one third PUCCH resource in the at least one third PUCCH resource is used to transmit one positive SR; and receiving, on the first PUCCH resource, the CSI and the HARQ-ACK that are transmitted by the terminal device, and receiving, on the at least one third PUCCH resource, the at least one positive SR transmitted by the terminal device.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2, PUCCH format 3, or PUCCH format 4.

In a possible design, a start symbol of the first PUCCH resource is the same as a start symbol of the fourth PUCCH resource, or an end symbol of the first PUCCH resource is the same as an end symbol of the fourth PUCCH resource.

According to a thirteenth aspect, an embodiment of this application provides an uplink control information sending apparatus, and the apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, to enable the terminal device to perform one of the following: the method in any one of the first aspect and the possible designs of the first aspect, the method in any one of the third aspect and the possible designs of the third aspect, the method in any one of the fifth aspect and the possible designs of the fifth aspect, the method in any one of the seventh aspect and the possible designs of the seventh aspect, the method in any one of the ninth aspect and the possible designs of the ninth aspect, or the method in any one of the eleventh aspect and the possible designs of the eleventh aspect. When the apparatus is a chip in a terminal device, the processing unit may be a processor, and the transceiver unit may be an input/output interface, a pin, a circuit, or the like. The processing unit executes an instruction stored in a storage unit, to enable the terminal device to perform one of the following: the method in any one of the first aspect and the possible designs of the first aspect, the method in any one of the third aspect and the possible designs of the third aspect, the method in any one of the fifth aspect and the possible designs of the fifth aspect, the method in any one of the seventh aspect and the possible designs of the seventh aspect, the method in any one of the ninth aspect and the possible designs of the ninth aspect, or the method in any one of the eleventh aspect and the possible designs of the eleventh aspect. The storage unit may be a storage unit (for example, a register or a cache) inside the chip, or may be a storage unit (for example, a read-only memory or a random access memory) that is in the terminal device and that is located outside the chip.

According to a fourteenth aspect, an embodiment of this application provides an uplink control information receiving apparatus, and the apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, to enable the network device to perform one of the following: the method in any one of the second aspect and the possible designs of the second aspect, the method in any one of the fourth aspect and the possible designs of the fourth aspect, the method in any one of the sixth aspect and the possible designs of the sixth aspect, the method in any one of the eighth aspect and the possible designs of the eighth aspect, the method in any one of the tenth aspect and the possible designs of the tenth aspect, or the method in any one of the twelfth aspect and the possible designs of the twelfth aspect. When the apparatus is a chip in a network device, the processing unit may be a processor, and the transceiver unit may be an input/output interface, a pin, a circuit, or the like. The processing unit executes an instruction stored in a storage unit, to enable the network device to perform one of the following: the method in any one of the second aspect and the possible designs of the second aspect, the method in any one of the fourth aspect and the possible designs of the fourth aspect, the method in any one of the sixth aspect and the possible designs of the sixth aspect, the method in any one of the eighth aspect and the possible designs of the eighth aspect, the method in any one of the tenth aspect and the possible designs of the tenth aspect, or the method in any one of the twelfth aspect and the possible designs of the twelfth aspect. The storage unit may be a storage unit (for example, a register or a cache) inside the chip, or may be a storage unit (for example, a read-only memory or a random access memory) that is in the network device and that is located outside the chip.

According to a fifteenth aspect, an embodiment of this application provides a chip, and the chip is connected to a memory, and is configured to read and execute a program stored in the memory, to implement the methods in the first aspect to the twelfth aspect.

According to a sixteenth aspect, an embodiment of this application provides a terminal device, and the terminal device includes a transceiver, a processor, and a memory. The memory is configured to store a computer program, and the processor invokes a computer program stored in the memory, and performs the method according to any one of the first aspect and the possible designs of the first aspect by using the transceiver, or performs the method according to any one of the third aspect and the possible designs of the third aspect by using the transceiver, or performs the method according to any one of the fifth aspect and the possible designs of the fifth aspect by using the transceiver, or performs the method according to any one of the seventh aspect and the possible designs of the seventh aspect by using the transceiver, or performs the method according to any one of the ninth aspect and the possible designs of the ninth aspect by using the transceiver, or performs the method according to any one of the eleventh aspect and the possible designs of the eleventh aspect.

According to a seventeenth aspect, an embodiment of this application provides a network device, and the network device includes a transceiver, a processor, and a memory. The memory is configured to store a computer program, and the processor invokes a computer program stored in the memory, and performs the method according to any one of the second aspect and the possible designs of the second aspect by using the transceiver, or performs the method according to any one of the fourth aspect and the possible designs of the fourth aspect by using the transceiver, or performs the method according to any one of the sixth aspect and the possible designs of the sixth aspect by using the transceiver, or performs the method according to any one of the eighth aspect and the possible designs of the eighth aspect by using the transceiver, or performs the method according to any one of the tenth aspect and the possible designs of the tenth aspect by using the transceiver, or performs the method according to any one of the twelfth aspect and the possible designs of the twelfth aspect.

According to an eighteenth aspect, an embodiment of this application further provides a computer readable storage medium, where the computer readable storage medium stores a computer program, and when the computer program runs on a computer, the computer is enabled to perform the methods in the foregoing aspects.

According to a nineteenth aspect, an embodiment of this application further provides a computer program product that includes a program, where when the program runs on a computer, the computer is enabled to perform the methods in the foregoing aspects.

According to a twentieth aspect, an embodiment of this application further provides a network system, where the network system includes the terminal device in the thirteenth aspect or the sixteenth aspect and the network device in the fourteenth aspect or the seventeenth aspect.

DESCRIPTION OF EMBODIMENTS

Figure 1:
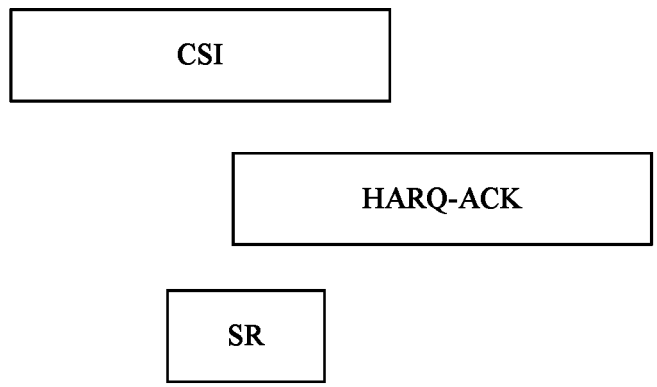
FIG. 1 is a schematic diagram of partial overlapping of OFDM symbols occupied by three types of UCI in a same slot according to an embodiment of this application.

The following describes the embodiments of this application with reference to the accompanying drawings.

The embodiments of this application may be applied to a 5G system. Network elements involved in the embodiments of this application include a network device and a terminal device.

The network device is a specific implementation form of an access network (AN), and may also be referred to as an access node. If radio access is used, the network device is referred to as a radio access network (RAN), and provides a radio access service for the terminal device. The access node may be specifically a base station in a global system for mobile communications (GSM) system or a code division multiple access (CDMA) system, a NodeB (NodeB) in a wideband code division multiple access (WCDMA) system, an evolved NodeB (eNB or eNodeB) in an LTE system, a base station device, a small cell device, a wireless access node (for example, wireless fidelity access point (WiFi AP)), or a worldwide interoperability for microwave access base station (WiMAX BS) in a 5G network, or the like. This is not limited in this application.

The terminal device may be a wireless terminal or a wired terminal. The wireless terminal may be a device that provides voice and/or data connectivity for a user, a handheld device with a wireless connection function, or another processing device connected to a wireless modem. The wireless terminal may communicate with at least one core network through a radio access network (RAN). The wireless terminal may be a mobile terminal such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit (SU), a subscriber station (SS), a mobile station (MS), a mobile console, a remote station (RS), an access point (AP), a remote terminal (RT), an access terminal (AT), a user terminal (UT), a user agent (UA), or user equipment (UE).

Three types of PUCCH resources are involved in the embodiments of this application, including a first PUCCH resource, a second PUCCH resource, and a third PUCCH resource. The three types of PUCCH resources are respectively described below.

First, the First PUCCH Resource:

Specifically, the network device schedules, by using downlink scheduling signaling, the terminal device to receive downlink data, and configures, for the terminal device by using the downlink scheduling signaling, a PUCCH resource used to transmit a HARQ-ACK, namely, the first PUCCH resource. First information shown in the embodiments of this application may be one of a plurality of pieces of information included in the downlink scheduling signaling, and is used to indicate the first PUCCH resource.

When the network device schedules the terminal device to receive the downlink data, the terminal device needs to send an acknowledgment (ACK) to the network device on the first PUCCH resource, to notify the network device that the terminal device successfully receives the downlink data, or send a negative acknowledgment (NACK) to the network device on the first PUCCH resource, to notify the network device that the terminal device fails to receive the downlink data. Therefore, the first PUCCH resource is dynamically configured by the network device for the terminal device.

Second, the Second PUCCH Resource:

The network device configures, for the terminal device by using radio resource control (RRC) signaling, a PUCCH resource used to transmit CSI and a related parameter (including a parameter such as a sending period or an offset)

of the CSI. The terminal device sends the CSI by using the parameter configured by the network device and the PUCCH resource used to transmit the CSI.

Specifically, when the PUCCH resource that is configured by the network device to transmit the CSI is a PUCCH resource used to transmit periodic CSI, the network device directly configures the second PUCCH resource. When the network device configures a plurality of PUCCH resources that have different periodicities and that are used to transmit the CSI, when determining whether there is an overlapping relationship among the first PUCCH resource, the second PUCCH resource, and at least one third PUCCH resource, the network device and the terminal device first need to combine the plurality of PUCCH resources that have different periodicities and that are used to transmit the CSI into one PUCCH resource by using an existing combination solution, and use the PUCCH resource as the second PUCCH resource. The network device and the terminal device determine the second PUCCH resource by using a same combination solution, and determine, based on the determined second PUCCH resource, whether there is an overlapping relationship among the PUCCH resources. It should be understood that a specific combination solution may be a combination solution known in the prior art, and this is not limited in the embodiments of this application.

Therefore, the second PUCCH resource in the embodiments of this application is a PUCCH resource used to transmit one piece of periodic CSI, or is a PUCCH resource used to transmit a plurality of pieces of periodic CSI.

Third, the Third PUCCH Resource:

The network device configures, for the terminal device by using RRC signaling, a PUCCH resource used to transmit a positive SR, namely, the third PUCCH resource, and a related parameter (including a parameter such as a sending period) of the SR. Specifically, a quantity of third PUCCH resources may be a positive integer greater than or equal to 1. If the terminal device needs to send a positive SR, the terminal device may choose to send the positive SR on one of at least one third PUCCH resource. If the terminal device does not need to send a positive SR, the terminal device does not send a positive SR on any of at least one third PUCCH resource.

Therefore, the PUCCH resource used to transmit the CSI and the PUCCH resource used to transmit the positive SR are semi-statically configured by the network device.

It should be noted that, in the embodiments of this application, that two PUCCH resources partially overlap in terms of time may be that start symbols of the two PUCCH resources are the same, or may be that start symbols of the two PUCCH resources are different. If the start symbols of the two PUCCH resources are the same, end symbols of the two PUCCH resources are different. Similarly, in the embodiments of this application, that two PUCCH resources partially overlap in terms of time may be that end symbols of the two PUCCH resources are the same, or may be that end symbols of the two PUCCH resources are different. If the end symbols of the two PUCCH resources are the same, start symbols of the two PUCCH resources are different.

An uplink control information sending and receiving method provided in the embodiments of this application in different scenarios is described below with reference to FIG. 2, FIG. 5, and FIG. 7, to resolve a problem of how to send three different types of UCI when OFDM symbols occupied by the three different types of UCI in a same slot partially overlap, keep a single-carrier characteristic of uplink sending of a terminal device, and ensure that the UCI can be correctly received by a network device.

Figure 2:
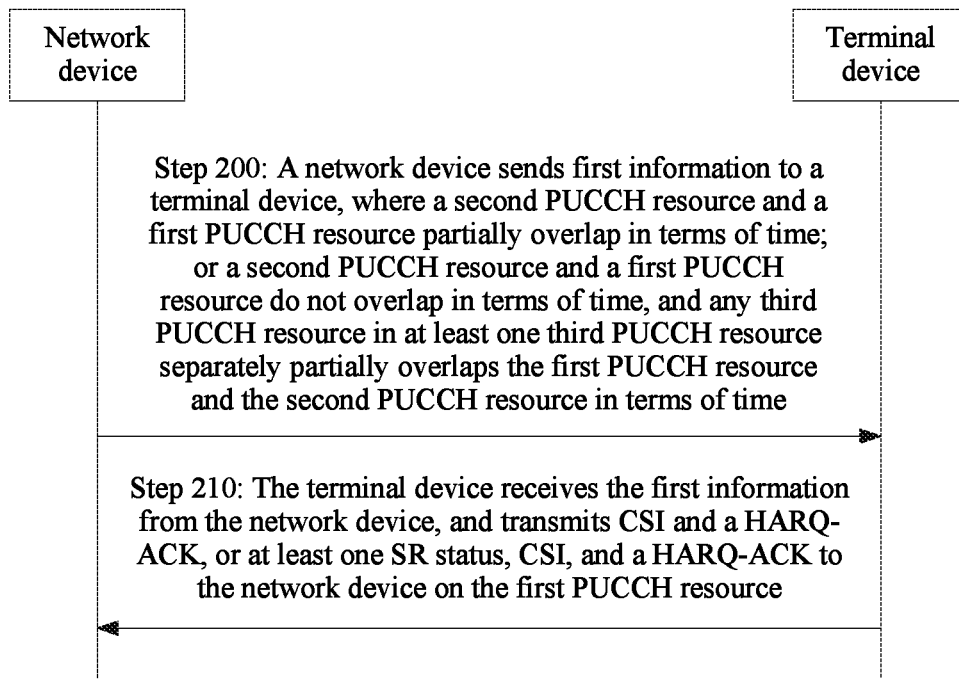
FIG. 2 is an overview flowchart 1 of an uplink control information sending and receiving method according to an embodiment of this application.

As shown in FIG. 2, an embodiment of this application provides an uplink control information sending and receiving method, and the method includes the following steps.

Step 200: A network device sends first information to a terminal device.

The first information indicates a first PUCCH resource, and the first PUCCH resource is used to transmit a HARQ-ACK.

A second PUCCH resource and the first PUCCH resource partially overlap in terms of time; or a second PUCCH resource and the first PUCCH resource do not overlap in terms of time, and any third PUCCH resource in at least one third PUCCH resource respectively partially overlaps the first PUCCH resource and the second PUCCH resource in terms of time.

Figure 3A:
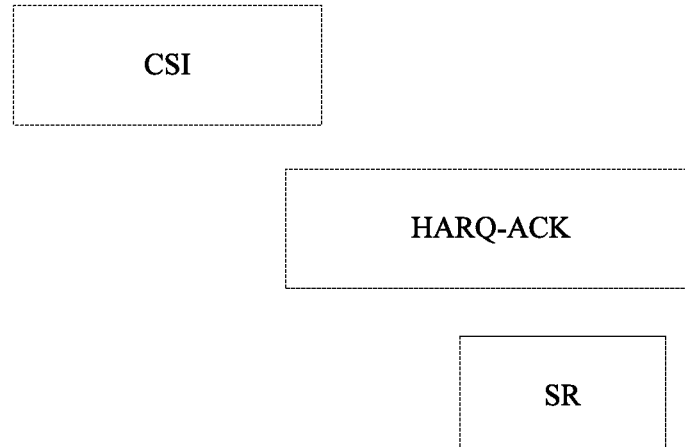
FIG. 3(a) to FIG. 3(e) are schematic diagrams of a scenario 1 corresponding to the embodiment shown in FIG. 2.

It should be understood that the network device may determine an overlapping relationship among the first PUCCH resource, the second PUCCH resource, and the at least one third PUCCH resource based on the first PUCCH resource, the second PUCCH resource, and the at least one third PUCCH resource. There may be specifically two types of application scenarios of this embodiment:

Scenario 1: The second PUCCH resource and the first PUCCH resource partially overlap in terms of time, which may specifically include, but is not limited to, the following several cases:

(1) A quantity of the at least one third PUCCH resource is 1, the second PUCCH resource and the first PUCCH resource partially overlap in terms of time, the third PUCCH resource and the first PUCCH resource partially overlap in terms of time, and the third PUCCH resource and the second PUCCH resource do not overlap in terms of time, as shown in FIG. 3(a).

Figure 3B:
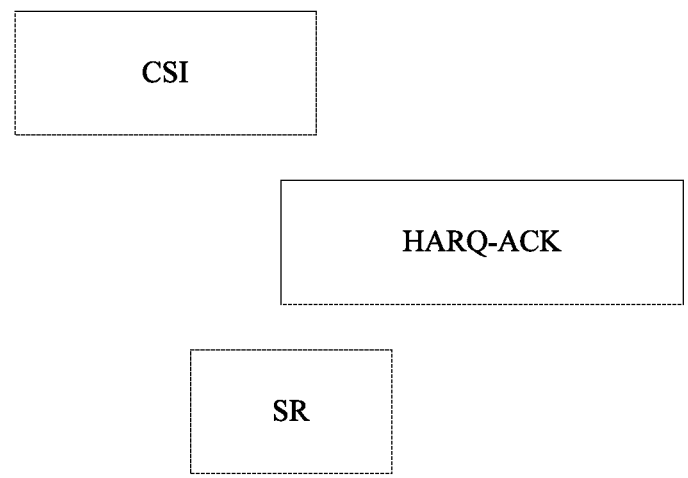

(2) A quantity of the at least one third PUCCH resource is 1, the second PUCCH resource and the first PUCCH resource partially overlap in terms of time, the third PUCCH resource and the first PUCCH resource partially overlap in terms of time, and the third PUCCH resource and the second PUCCH resource partially overlap in terms of time, as shown in FIG. 3(b).

Figure 3C:
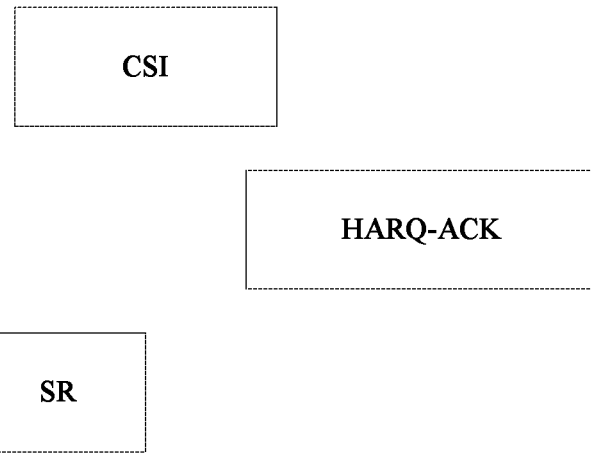

(3) A quantity of the at least one third PUCCH resource is 1, the second PUCCH resource and the first PUCCH resource partially overlap in terms of time, the third PUCCH resource and the first PUCCH resource do not overlap in terms of time, and the third PUCCH resource and the second PUCCH resource partially overlap in terms of time, as shown in FIG. 3(c).

(4) A quantity of the at least one third PUCCH resource is K, K is a positive integer greater than or equal to 2, the second PUCCH resource and the first PUCCH resource partially overlap in terms of time, and the K third PUCCH resources include a third PUCCH resource that partially overlaps at least one of the first PUCCH resource and the second PUCCH resource in terms of time.

Figure 3D:
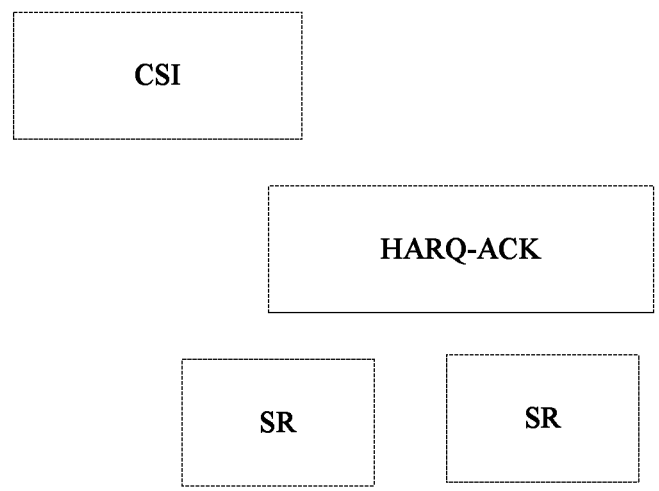

As shown in FIG. 3(d), the second PUCCH resource and the first PUCCH resource partially overlap in terms of time. It is assumed that K=2. One third PUCCH resource respectively partially overlaps the first PUCCH resource and the second PUCCH resource in terms of time, and the other third PUCCH resource partially overlaps the first PUCCH resource in terms of time. It should be understood that the case (4) may include a plurality of possible cases. FIG. 3(d) is only an example, and does not limit this embodiment of this application.

Figure 4A:
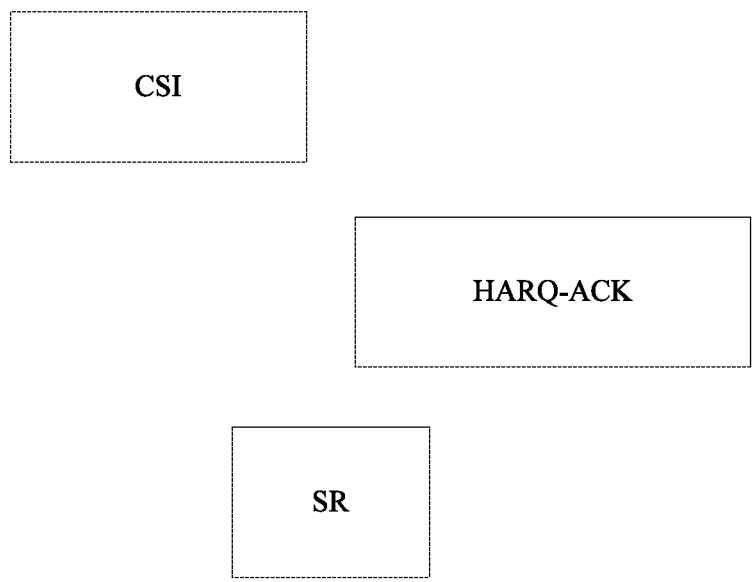
FIG. 4(a) and FIG. 4(b) are schematic diagrams of a scenario 2 corresponding to the embodiment shown in FIG. 2.

Scenario 2: The second PUCCH resource and the first PUCCH resource do not overlap in terms of time, and any third PUCCH resource in the at least one third PUCCH resource respectively partially overlaps the first PUCCH resource and the second PUCCH resource in terms of time, which may specifically include, but is not limited to, the following cases:

(1) A quantity of the at least one third PUCCH resource is 1, the second PUCCH resource and the first PUCCH resource do not overlap in terms of time, the third PUCCH resource and the first PUCCH resource partially overlap in terms of time, and the third PUCCH resource and the second PUCCH resource partially overlap in terms of time, as shown in FIG. 4(a).

(2) A quantity of the at least one third PUCCH resource is K, K is a positive integer greater than or equal to 2, the second PUCCH resource and the first PUCCH resource do not overlap in terms of time, and the K third PUCCH resources include a third PUCCH resource that partially overlaps the first PUCCH resource and the second PUCCH resource in terms of time, in other words, at least one of the K third PUCCH resources partially overlaps the first PUCCH resource and the second PUCCH resource in terms of time.

Figure 4B:
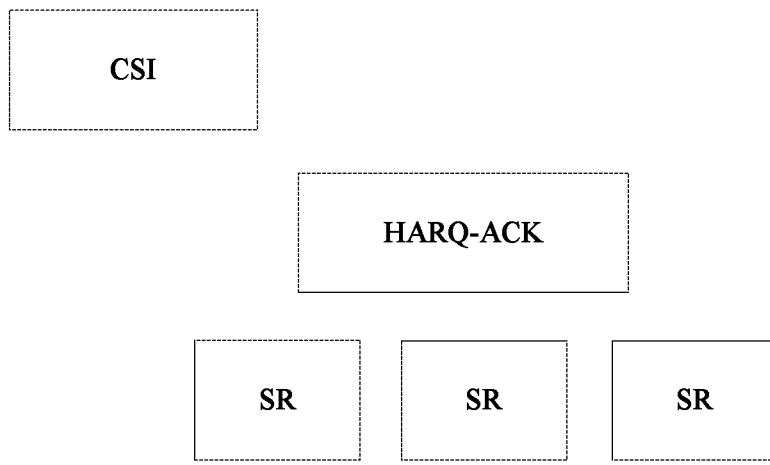

As shown in FIG. 4(b), the second PUCCH resource and the first PUCCH resource do not overlap in terms of time. It is assumed that K=3. One third PUCCH resource respectively partially overlaps the first PUCCH resource and the second PUCCH resource in terms of time, and the other two third PUCCH resources partially overlap the first PUCCH resource in terms of time. It should be understood that the case (2) may include a plurality of possible cases. FIG. 4(b) is only an example, and does not limit this embodiment of this application.

Step 210: The terminal device receives the first information from the network device, and transmits at least one SR status, CSI, and the HARQ-ACK to the network device on the first PUCCH resource, where the SR status is a positive SR or a negative SR.

It should be understood that, the terminal device determines the first PUCCH resource after receiving the first information. Similarly, the terminal device may determine the overlapping relationship among the first PUCCH resource, the second PUCCH resource, and the at least one third PUCCH resource based on the first PUCCH resource, the second PUCCH resource, and the at least one third PUCCH resource. A specific overlapping relationship is described above, and repeated parts are not described again. Therefore, the network device does not need to notify the terminal device of the overlapping relationship among the first PUCCH resource, the second PUCCH resource, and the at least one third PUCCH resource, and the terminal device may determine the overlapping relationship among the first PUCCH resource, the second PUCCH resource, and the at least one third PUCCH resource based on the first information and existing PUCCH resource configuration information.

Figure 3E:
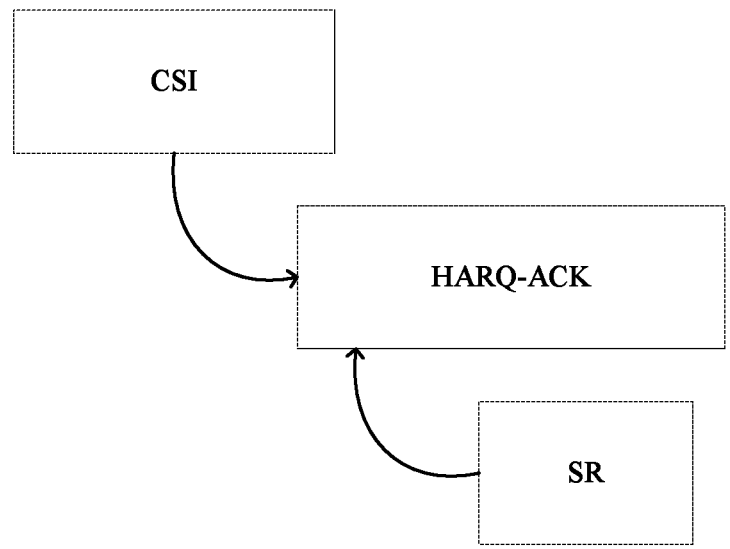

In addition, both the terminal device and the network device can determine the overlapping relationship among the first PUCCH resource, the second PUCCH resource, and the at least one third PUCCH resource. Therefore, the network device can also determine that, in the overlapping relationship described in this embodiment, the terminal device transmits the at least one SR status, the CSI, and the HARQ-ACK to the network device on the first PUCCH resource. Therefore, the network device receives, on the first PUCCH resource, the at least one SR status, the CSI, and the HARQ-ACK that are transmitted by the terminal device. For example, FIG. 3(e) is a schematic diagram showing that the terminal device transmits an SR status, the CSI, and the HARQ-ACK to the network device on the first PUCCH resource in a scenario corresponding to FIG. 3(a).

In a possible design, the first information includes an acknowledgment resource indicator (ARI) field.

Specifically, the network device configures at least one PUCCH resource set (PUCCH resource set) for the terminal device. The at least one PUCCH resource set is configured by the network device by using higher layer signaling, and there is a one-to-one correspondence between the PUCCH resource set and a payload size range. One PUCCH resource set may include at least eight PUCCH resources, and one PUCCH resource corresponds to one ARI field. It should be understood that one ARI field can be used to indicate one PUCCH resource or one PUCCH resource subset in the PUCCH resource set. If one ARI field is used to indicate one PUCCH resource subset, one PUCCH resource is further determined through implicit indication, but a specific PUCCH resource set cannot be indicated.

In this embodiment, the network device determines a total payload size based on a payload size of the at least one SR status, a payload size of the CSI, and a payload size of the HARQ-ACK, determines, based on the total payload size, a PUCCH resource set corresponding to the total payload size, and selects a PUCCH resource from the PUCCH resource set as the first PUCCH resource. Therefore, the ARI field included in the first information is an ARI field corresponding to the selected PUCCH resource.

After receiving the first information, the terminal device determines the total payload size based on the payload size of the at least one SR status, the payload size of the CSI, and the payload size of the HARQ-ACK, determines, based on the total payload size, the PUCCH resource set corresponding to the total payload size, and selects a PUCCH resource from the PUCCH resource set as the first PUCCH resource based on the ARI field.

Alternatively, after receiving the first information, the terminal device determines, based on a PUCCH resource set corresponding to the payload size of the HARQ-ACK and based on the ARI field, a PUCCH resource or a PUCCH resource subset in the PUCCH resource set; determines, based on a PUCCH start symbol, a PUCCH end symbol, or a PUCCH start symbol and a PUCCH end symbol corresponding to the PUCCH resource or the PUCCH resource subset, that the PUCCH resource or the PUCCH resource subset meets an overlapping relationship between the first PUCCH resource and another PUCCH resource in the scenario 1 or the scenario 2 corresponding to the embodiment shown in FIG. 2; determines the total payload size based on the payload size of the at least one SR status, the payload size of the CSI, and the payload size of the HARQ-ACK; determines, based on the total payload size, the PUCCH resource set corresponding to the total payload size; and determines a PUCCH resource in the PUCCH resource set as the first PUCCH resource based on the ARI field. The PUCCH resource set corresponding to the total payload size is the same as the PUCCH resource set corresponding to the payload size of the HARQ-ACK.

It should be noted that the at least one SR status transmitted by the terminal device may include the following several cases:

(1) When the quantity of the at least one third PUCCH resource is 1, if the terminal device needs to send a positive SR, the at least one SR status is a positive SR, or if the terminal device does not need to send a positive SR, the at least one SR status is a negative SR. Because the at least one SR status, the CSI, and the HARQ-ACK are transmitted on one PUCCH resource, reserved bits are used to transmit the at least one SR status. Therefore, even if the terminal device does not need to send a positive SR, a negative SR is transmitted.

(2) In the prior art, when the quantity of the at least one third PUCCH resource is K, where K is a positive integer greater than or equal to 2, and when the at least one third PUCCH resource overlaps neither the first PUCCH resource nor the second PUCCH resource in terms of time, if the terminal device needs to send a positive SR, the terminal device selects a third PUCCH resource from the K third PUCCH resources to send the positive SR, does not send any content on any other third PUCCH resource, and does not select a plurality of third PUCCH resources from the K third PUCCH resources to send a plurality of positive SRs. If the terminal device does not need to send a positive SR, the terminal device does not send a positive SR on the K third PUCCH resources, and does not send any content.

In the scenario 1 and the scenario 2, the at least one SR status needs to indicate SR configuration of a specific third PUCCH resource in the K third PUCCH resources on which the terminal device sends the positive SR, or indicate that the terminal device sends no positive SR on SR configuration corresponding to the K third PUCCH resources.

In a possible design, a quantity of bits occupied by the at least one SR status is $\lceil \log_2(K+1) \rceil$.

For example, it is assumed that K=3, $\lceil \log_2(K+1) \rceil$=2, and the at least one SR status occupies 2 bits. 00 indicates a negative SR, that is, 00 indicates that the terminal device does not sends positive SR; 01 indicates a positive SR, and the positive SR indicates SR configuration corresponding to the $1^{st}$ third PUCCH resource; 10 indicates a positive SR, and the positive SR indicates SR configuration corresponding to the $2^{nd}$ third PUCCH resource; and 11 indicates a positive SR, and the positive SR indicates the SR configuration corresponding to the $3^{rd}$ third PUCCH resource. It should be understood that the foregoing correspondences are merely examples, and do not limit this embodiment of this application.

Specifically, the first information further indicates that a PUCCH format used to transmit the HARQ-ACK is a PUCCH format 0, a PUCCH format 1, PUCCH format 2, PUCCH format 3, or PUCCH format 4.

When the first information indicates that the PUCCH format used to transmit the HARQ-ACK is the PUCCH format 0 or the PUCCH format 1, because the PUCCH format 0 or the PUCCH format 1 specifies that 1 or 2 bits are occupied, the terminal device transmits only at least one SR and the HARQ-ACK on the first PUCCH resource, and does not transmit the CSI.

When the first information indicates that the PUCCH format used to transmit the HARQ-ACK is the PUCCH format 2, the terminal device jointly encodes the at least one SR status, the CSI, and the HARQ-ACK before transmitting the at least one SR status, the CSI, and the HARQ-ACK.

When the first information indicates that the PUCCH format used to transmit the HARQ-ACK is the PUCCH format 3 or the PUCCH format 4, before transmitting the at least one SR status, the CSI, and the HARQ-ACK, the terminal device jointly encodes the at least one SR status, the HARQ-ACK, and a first part of the CSI (CSI part 1), and independently encodes a second part of the CSI (CSI part 2).

The PUCCH format 2, the PUCCH format 3, or the PUCCH format 4 specifies that more than 2 bits are occupied.

In conclusion, to resolve a problem of how to send three different types of UCI when OFDM symbols occupied by the three different types of UCI in a same slot partially overlap, in the embodiment shown in FIG. 2, the network device dynamically configures the first PUCCH resource for the terminal device, and when the first PUCCH resource and another PUCCH resource meet the overlapping relationship between the first PUCCH resource and another PUCCH resource in the scenario 1 or the scenario 2 corresponding to the embodiment shown in FIG. 2, the terminal device transmits the at least one SR status, the CSI, and the HARQ-ACK to the network device on the first PUCCH resource. Therefore, according to the method provided in this embodiment of this application, a single-carrier characteristic of uplink sending of the terminal device can be kept, and it is ensured that the UCI can be correctly received by the network device.

Figure 5:
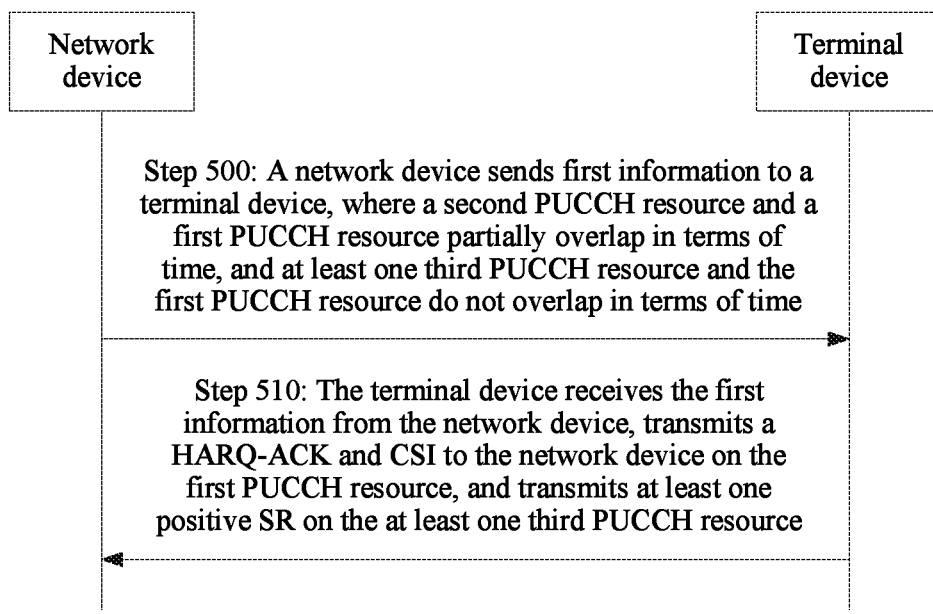
FIG. 5 is an overview flowchart 2 of an uplink control information sending and receiving method according to an embodiment of this application.

As shown in FIG. 5, an embodiment of this application provides an uplink control information sending and receiving method, and the method includes the following steps.

Step 500: A network device sends first information to a terminal device.

The first information indicates a first PUCCH resource, and the first PUCCH resource is used to transmit a HARQ-ACK.

A second PUCCH resource and the first PUCCH resource partially overlap in terms of time, and at least one third PUCCH resource and the first PUCCH resource do not overlap in terms of time.

It should be understood that, similar to the embodiment shown in FIG. 2, the network device may determine an overlapping relationship among the first PUCCH resource, the second PUCCH resource, and the at least one third PUCCH resource based on the first PUCCH resource, the second PUCCH resource, and the at least one third PUCCH resource. An application scenario of this embodiment is as follows: The second PUCCH resource and the first PUCCH resource partially overlap in terms of time, and the at least one third PUCCH resource and the first PUCCH resource do not overlap in terms of time. This may specifically include but is not limited to the following several cases:

(1) A quantity of the at least one third PUCCH resource is 1, the second PUCCH resource and the first PUCCH resource partially overlap in terms of time, the third PUCCH resource and the first PUCCH resource do not overlap in terms of time, and the third PUCCH resource and the second PUCCH resource partially overlap in terms of time, as shown in FIG. 3(c).

(2) A quantity of the at least one third PUCCH resource is K, K is a positive integer greater than or equal to 2, the second PUCCH resource and the first PUCCH resource partially overlap in terms of time, none of the K third PUCCH resources overlaps the first PUCCH resource in terms of time, and any third PUCCH resource in the K third PUCCH resources and the second PUCCH resource partially overlap in terms of time.

Figure 6:
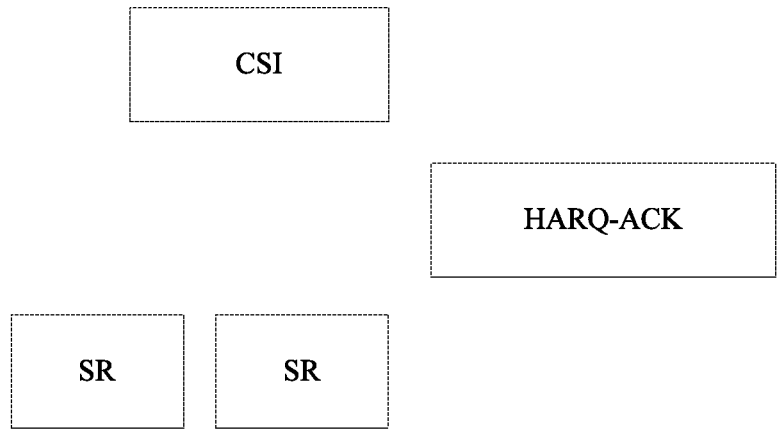
FIG. 6 is a schematic diagram of an application scenario corresponding to the embodiment shown in FIG. 5.

As shown in FIG. 6, the second PUCCH resource and the first PUCCH resource partially overlap in terms of time. It is assumed that K=2, and the two third PUCCH resources each partially overlap the second PUCCH resource in terms of time. It should be understood that the case (2) may include a plurality of possible cases. FIG. 6 is only an example, and does not limit this embodiment of this application.

Further, it should be understood that the scenario corresponding to the embodiment shown in FIG. 5 may be considered as a subset of the scenario 1 in the embodiment shown in FIG. 2.

Step 510: The terminal device receives the first information from the network device, transmits the HARQ-ACK and CSI to the network device on the first PUCCH resource, and transmits at least one positive SR on the at least one third PUCCH resource.

It should be understood that, similar to the embodiment shown in FIG. 2, the terminal device determines the first PUCCH resource after receiving the first information. Similarly, the terminal device may determine the overlapping relationship among the first PUCCH resource, the second PUCCH resource, and the at least one third PUCCH resource based on the first PUCCH resource, the second PUCCH resource, and the at least one third PUCCH resource. A specific overlapping relationship is described above, and repeated parts are not described again. Therefore, the network device does not need to notify the terminal device of the overlapping relationship among the first PUCCH resource, the second PUCCH resource, and the at least one third PUCCH resource, and the terminal device may determine the overlapping relationship among the first PUCCH resource, the second PUCCH resource, and the at least one third PUCCH resource based on the first information and existing PUCCH resource configuration information.

In addition, both the terminal device and the network device can determine the overlapping relationship among the first PUCCH resource, the second PUCCH resource, and the at least one third PUCCH resource. Therefore, the network device can also determine that, in the overlapping relationship described in this embodiment, the terminal device transmits the CSI and the HARQ-ACK to the network device on the first PUCCH resource, and transmits the at least one positive SR on the at least one third PUCCH resource. Therefore, the network device receives, on the first PUCCH resource, the CSI and the HARQ-ACK that are transmitted by the terminal device, and receives, on the at least one third PUCCH resource, the at least one positive SR transmitted by the terminal device.

It should be noted that the transmitting, by the terminal device, the at least one positive SR on the at least one third PUCCH resource may include the following two cases:

(1) When the quantity of the at least one third PUCCH resource is 1, if the terminal device needs to send a positive SR, the terminal device sends the positive SR on the third PUCCH resource; or if the terminal device does not need to send a positive SR, the terminal device does not send any content on the third PUCCH resource.

(2) When the quantity of the at least one third PUCCH resource is K, where K is a positive integer greater than or equal to 2, if the terminal device needs to send a positive SR, the terminal device selects a third PUCCH resource from the K third PUCCH resources to send the positive SR, sends no content on any other third PUCCH resources, and does not select a plurality of third PUCCH resources from the K third PUCCH resources to send a plurality of positive SRs; or if the terminal device does not need to send a positive SR, the terminal device sends a positive SR on none of the K third PUCCH resources, and does not transmit any content.

Similar to the embodiment shown in FIG. 2, in a possible design, the first information includes an acknowledgment resource indicator ARI field.

In this embodiment, the network device determines a total payload size based on a payload size of the CSI and a payload size of the HARQ-ACK, determines, based on the total payload size, a PUCCH resource set corresponding to the total payload size, and selects a PUCCH resource from the PUCCH resource set as the first PUCCH resource. Therefore, the ARI field included in the first information is corresponding to the selected PUCCH resource.

After receiving the first information, the terminal device determines the total payload size based on the payload size of the CSI and the payload size of the HARQ-ACK, determines, based on the total payload size, the PUCCH resource set corresponding to the total payload size, and selects a PUCCH resource from the PUCCH resource set as the first PUCCH resource based on the ARI field.

Alternatively, after receiving the first information, the terminal device determines, based on a PUCCH resource set corresponding to the payload size of the HARQ-ACK and based on the ARI field, a PUCCH resource or a PUCCH resource subset in the PUCCH resource set; determines, based on a PUCCH start symbol, a PUCCH end symbol, or a PUCCH start symbol and a PUCCH end symbol corresponding to the PUCCH resource or the PUCCH resource subset, that the PUCCH resource or the PUCCH resource subset meets an overlapping relationship between the first PUCCH resource and another PUCCH resource in the scenario corresponding to the embodiment shown in FIG. 5; determines the total payload size based on the payload size of the CSI and the payload size of the HARQ-ACK; determines, based on the total payload size, the PUCCH resource set corresponding to the total payload size; and determines a PUCCH resource in the PUCCH resource set as the first PUCCH resource based on the ARI field. The PUCCH resource set corresponding to the total payload size is the same as the PUCCH resource set corresponding to the payload size of the HARQ-ACK.

It should be understood that the total payload size in the embodiment shown in FIG. 2 is a sum of the payload size of the at least one SR status, the payload size of the CSI, and the payload size of the HARQ-ACK. In the embodiment shown in FIG. 5, the total payload size is a sum of the payload size of the CSI and the payload size of the HARQ-ACK.

In addition, similar to the embodiment shown in FIG. 2, specifically, the first information further indicates that a PUCCH format used to transmit the HARQ-ACK is a PUCCH format 0, a PUCCH format 1, PUCCH format 2, PUCCH format 3, or PUCCH format 4.

When the first information indicates that the PUCCH format used to transmit the HARQ-ACK is the PUCCH format 0 or the PUCCH format 1, because the PUCCH format 0 or the PUCCH format 1 specifies that 1 or 2 bits are occupied, the terminal device transmits only the HARQ-ACK on the first PUCCH resource.

When the first information indicates that the PUCCH format used to transmit the HARQ-ACK is the PUCCH format 2, the terminal device jointly encodes the CSI and the HARQ-ACK before transmitting the CSI and the HARQ-ACK.

When the first information indicates that the PUCCH format used to transmit the HARQ-ACK is the PUCCH format 3 or the PUCCH format 4, before transmitting the CSI and the HARQ-ACK, the terminal device jointly encodes the HARQ-ACK and a first part of the CSI (CSI part 1), and independently encodes a second part of the CSI (CSI part 2).

The PUCCH format 2, the PUCCH format 3, or the PUCCH format 4 specifies that more than 2 bits are occupied.

In conclusion, to resolve a problem of how to send three different types of UCI when OFDM symbols occupied by the three different types of UCI in a same slot partially overlap, in the embodiment shown in FIG. 5, the network device dynamically configures the first PUCCH resource for the terminal device, and when the first PUCCH resource and another PUCCH resource meet the overlapping relationship between the first PUCCH resource and another PUCCH resource in the application scenario corresponding to the embodiment shown in FIG. 5, the terminal device transmits the CSI and the HARQ-ACK to the network device on the first PUCCH resource, and transmits the at least one positive SR on the at least one third PUCCH resource. Therefore, according to the method provided in this embodiment of this application, a single-carrier characteristic of uplink sending of the terminal device can be kept, and it is ensured that the UCI can be correctly received by the network device.

Figure 7:
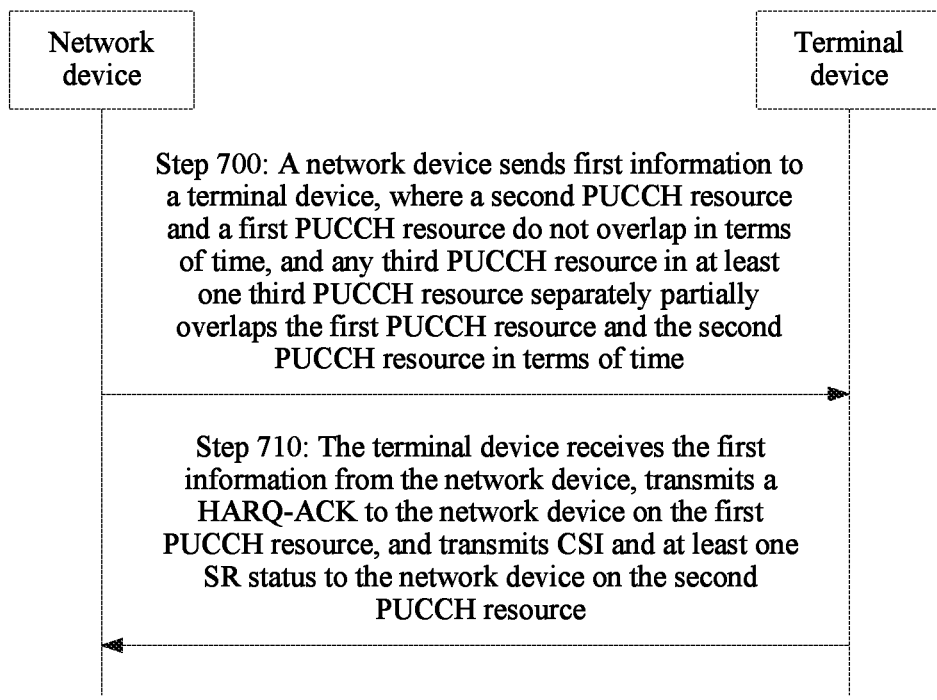
FIG. 7 is an overview flowchart 3 of an uplink control information sending and receiving method according to an embodiment of this application.

As shown in FIG. 7, an embodiment of this application provides an uplink control information sending and receiving method, and the method includes the following steps.

Step 700: A network device sends first information to a terminal device.

The first information indicates a first PUCCH resource, and the first PUCCH resource is used to transmit a HARQ-ACK.

A second PUCCH resource and the first PUCCH resource do not overlap in terms of time, and any third PUCCH resource in at least one third PUCCH resource respectively partially overlaps the first PUCCH resource and the second PUCCH resource in terms of time.

It should be understood that, similar to the embodiments shown in FIG. 2 and FIG. 5, the network device may determine an overlapping relationship among the first PUCCH resource, the second PUCCH resource, and the at least one third PUCCH resource based on the first PUCCH resource, the second PUCCH resource, and the at least one third PUCCH resource. An application scenario of this embodiment is as follows: The second PUCCH resource and the first PUCCH resource do not overlap in terms of time, and any third PUCCH resource in the at least one third PUCCH resource respectively partially overlaps the first PUCCH resource and the second PUCCH resource in terms of time. This is the same as the scenario 2 in the embodiment shown in FIG. 2. For details, refer to the cases (1) and (2) in the scenario 2 in the embodiment shown in FIG. 2. Repeated parts are not described again.

Step 710: The terminal device receives the first information from the network device, and the terminal device transmits the HARQ-ACK to the network device on the first PUCCH resource, and transmits CSI and at least one SR status to the network device on the second PUCCH resource.

It should be understood that, similar to the embodiments shown in FIG. 2 and FIG. 5, the terminal device determines the first PUCCH resource after receiving the first information. Similarly, the terminal device may determine the overlapping relationship among the first PUCCH resource, the second PUCCH resource, and the at least one third PUCCH resource based on the first PUCCH resource, the second PUCCH resource, and the at least one third PUCCH resource. A specific overlapping relationship is described above, and repeated parts are not described again. Therefore, the network device does not need to notify the terminal device of the overlapping relationship among the first PUCCH resource, the second PUCCH resource, and the at least one third PUCCH resource, and the terminal device may determine the overlapping relationship among the first PUCCH resource, the second PUCCH resource, and the at least one third PUCCH resource based on the first information and existing PUCCH resource configuration information.

In addition, both the terminal device and the network device can determine the overlapping relationship among the first PUCCH resource, the second PUCCH resource, and the at least one third PUCCH resource. Therefore, the network device can also determine that, in the overlapping relationship described in this embodiment, the terminal device transmits the HARQ-ACK to the network device on the first PUCCH resource, and transmits the CSI and the at least one SR status on the second PUCCH resource. Therefore, the network device receives, on the first PUCCH resource, the HARQ-ACK transmitted by the terminal device, and receives, on the second PUCCH resource, the CSI and the at least one SR status that are transmitted by the terminal device.

It should be noted that the at least one SR status transmitted by the terminal device on the second PUCCH resource is the same as the at least one SR status transmitted by the terminal device on the first PUCCH resource in the embodiment shown in FIG. 2, which may include the following several cases:

(1) When a quantity of the at least one third PUCCH resource is 1, if the terminal device needs to send a positive SR, the at least one SR status is a positive SR, or if the terminal device does not need to send a positive SR, the at least one SR status is a negative SR. Because the at least one SR status and the CSI are transmitted on one PUCCH resource, reserved bits are used to transmit the at least one SR status. Therefore, even if the terminal device does not need to send a positive SR, a negative SR is transmitted.

(2) When a quantity of the at least one third PUCCH resource is K, where K is a positive integer greater than or equal to 2, the at least one SR status needs to indicate a specific third PUCCH resource in the K third PUCCH resources on which the terminal device sends a positive SR, or indicate that the terminal device does not send a positive SR on any of the K third PUCCH resources.

In a possible design, a quantity of bits occupied by the at least one SR status is $\lceil \log_2(K+1) \rceil$.

In conclusion, to resolve a problem of how to send three different types of UCI when OFDM symbols occupied by the three different types of UCI in a same slot partially overlap, in the embodiment shown in FIG. 7, the network device dynamically configures the first PUCCH resource for the terminal device, and when the first PUCCH resource and another PUCCH resource meet the overlapping relationship between the first PUCCH resource and another PUCCH resource in the application scenario corresponding to the embodiment shown in FIG. 7, the terminal device transmits the HARQ-ACK to the network device on the first PUCCH resource, and transmits the CSI or the CSI and the at least one SR status to the network device on the second PUCCH resource. Therefore, according to the method provided in this embodiment of this application, a single-carrier characteristic of uplink sending of the terminal device can be kept, and it is ensured that the UCI can be correctly received by the network device.

As an extension to the foregoing embodiments respectively corresponding to FIG. 2, FIG. 5, and FIG. 7, embodiments of this application further provide uplink control information sending and receiving methods in different scenarios, to enable a network device to schedule reporting of a plurality of pieces of UCI on a same resource.

Figure 8:
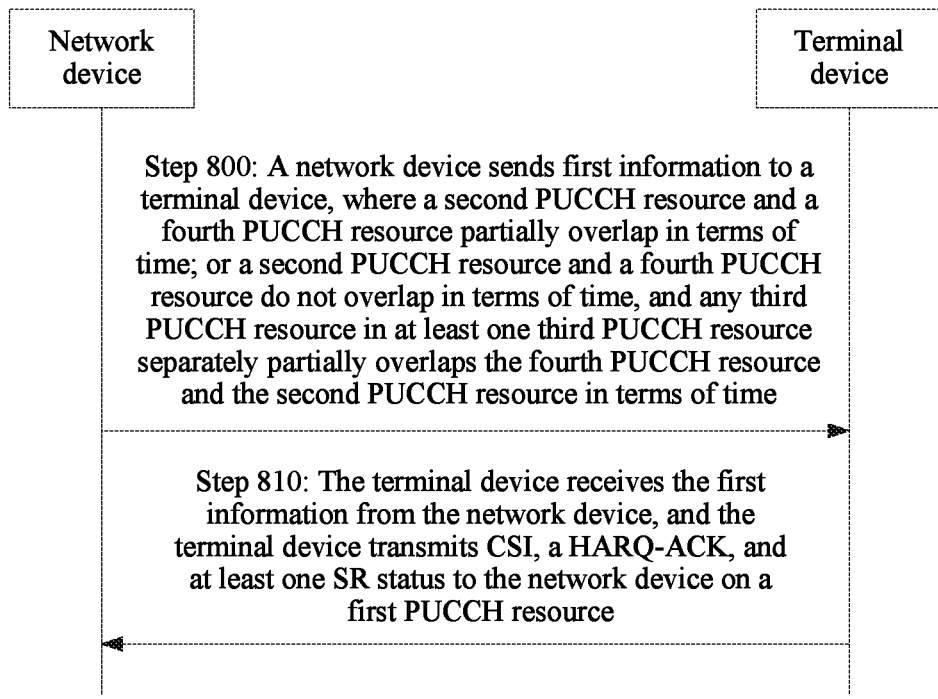
FIG. 8 is an overview flowchart 4 of an uplink control information sending and receiving method according to an embodiment of this application.

As shown in FIG. 8, an embodiment of this application further provides an uplink control information sending and receiving method, to enable a network device to schedule reporting of a plurality of pieces of UCI on a same resource. The method includes the following steps.

Step 800: The network device sends first information, where the first information indicates a first PUCCH resource, the first PUCCH resource is used to transmit a HARQ-ACK, and the first information includes an ARI field.

The first PUCCH resource is determined based on a total payload size and the ARI field, and the total payload size is a sum of a payload size of at least one SR status, a payload size of CSI, and a payload size of the HARQ-ACK. A fourth PUCCH resource is determined based on the payload size of the HARQ-ACK and the ARI field. The first PUCCH resource belongs to a first PUCCH resource set, and the fourth PUCCH resource belongs to a second PUCCH resource set.

It should be understood that in this embodiment of this application, the network device configures at least two PUCCH resource sets for a terminal device, the first PUCCH resource set is different from the second PUCCH resource set, a PUCCH resource set corresponding to the total payload size is the first PUCCH resource set, and a PUCCH resource set corresponding to the payload size of the HARQ-ACK is the second PUCCH resource set.

A second PUCCH resource and the fourth PUCCH resource partially overlap in terms of time; or a second PUCCH resource and the fourth PUCCH resource do not overlap in terms of time, and any third PUCCH resource in at least one third PUCCH resource respectively partially overlaps the fourth PUCCH resource and the second PUCCH resource in terms of time. The second PUCCH resource is used to transmit the CSI, at least one third PUCCH resource is used to transmit at least one positive SR, and one third PUCCH resource in the at least one third PUCCH resource is used to transmit one positive SR.

It should be understood that an overlapping relationship between the fourth PUCCH resource and other PUCCH resources is the same as that in the scenario 1 or the scenario 2 in the embodiment shown in FIG. 2, and repeated parts are not described again.

Step 810: The terminal device receives the first information from the network device, and the terminal device transmits the CSI, the HARQ-ACK, and the at least one SR status to the network device on the first PUCCH resource, where the SR status is a positive SR or a negative SR.

After receiving the first information, the terminal device first determines, based on the payload size of the HARQ-ACK, the PUCCH resource set corresponding to the payload size of the HARQ-ACK. After the terminal device determines, based on the ARI field, one PUCCH resource or one PUCCH resource subset in the PUCCH resource set corresponding to the payload size of the HARQ-ACK as the fourth PUCCH resource, and further determines, based on a PUCCH start symbol, a PUCCH end symbol, or a PUCCH start symbol and a PUCCH end symbol corresponding to the fourth PUCCH resource, that the fourth PUCCH resource and the second PUCCH resource partially overlap in terms of time, or that the second PUCCH resource and the fourth PUCCH resource do not overlap in terms of time and any third PUCCH resource in the at least one third PUCCH resource respectively partially overlaps the fourth PUCCH resource and the second PUCCH resource in terms of time, the terminal device determines the total payload size based on the payload size of the at least one SR status, the payload size of the CSI, and the payload size of the HARQ-ACK, determines, based on the total payload size, the PUCCH resource set corresponding to the total payload size, and determines a PUCCH resource in the PUCCH resource set corresponding to the total payload size as the first PUCCH resource based on the ARI field.

In a possible design, a start symbol of the first PUCCH resource is the same as the start symbol of the fourth PUCCH resource, or an end symbol of the first PUCCH resource is the same as the end symbol of the fourth PUCCH resource. For example, the start symbol of the first PUCCH resource is the same as the start symbol of the fourth PUCCH resource, and the end symbol of the first PUCCH resource is the same as the end symbol of the fourth PUCCH resource.

It should be understood that the first PUCCH resource may not have an overlapping relationship with other PUCCH resources, or may be in another possible overlapping relationship. This is not limited in this application.

In addition, the first information can further indicate a PUCCH format used to transmit the HARQ-ACK. For details, refer to the specific description in the embodiment shown in FIG. 2. A specific explanation of the at least one SR status transmitted by the terminal device is also the same as the specific description in the embodiment shown in FIG. 2. Details are not described herein again.

Figure 9:
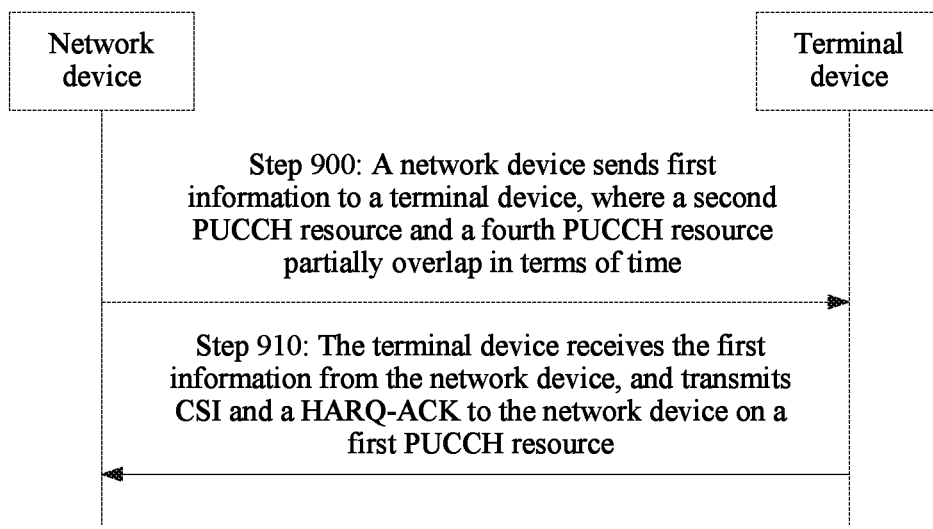
FIG. 9 is an overview flowchart 5 of an uplink control information sending and receiving method according to an embodiment of this application.

As shown in FIG. 9, an embodiment of this application further provides an uplink control information sending and receiving method, to enable a network device to schedule reporting of a plurality of pieces of UCI on a same resource. The method includes the following steps.

Step 900: The network device sends first information, where the first information indicates a first PUCCH resource, the first PUCCH resource is used to transmit a HARQ-ACK, and the first information includes an ARI field.

The first PUCCH resource is determined based on a total payload size and the ARI field, and the total payload size is a sum of a payload size of CSI and a payload size of the HARQ-ACK. A fourth PUCCH resource is determined based on the payload size of the HARQ-ACK and the ARI field. The first PUCCH resource belongs to a first PUCCH resource set, and the fourth PUCCH resource belongs to a second PUCCH resource set.

It should be understood that in this embodiment of this application, the network device configures at least two PUCCH resource sets for a terminal device, the first PUCCH resource set is different from the second PUCCH resource set, a PUCCH resource set corresponding to the total payload size is the first PUCCH resource set, and a PUCCH resource set corresponding to the payload size of the HARQ-ACK is the second PUCCH resource set.

A second PUCCH resource and the fourth PUCCH resource partially overlap in terms of time. The second PUCCH resource is used to transmit the CSI.

It should be understood that an overlapping relationship between the fourth PUCCH resource and another PUCCH resource is not limited in this embodiment. Specifically, an overlapping relationship between at least one third PUCCH resource and the fourth PUCCH resource and an overlapping relationship between at least one third PUCCH resource and the second PUCCH resource are not limited in this embodiment. Therefore, an application scenario corresponding to this embodiment is not totally the same as the scenario 1 in the embodiment shown in FIG. 2. This embodiment of this application further includes a scenario other than the scenario 1 in the embodiment shown in FIG. 2.

Step 910: The terminal device receives the first information from the network device, and the terminal device transmits the CSI and the HARQ-ACK to the network device on the first PUCCH resource.

After receiving the first information, the terminal device first determines, based on the payload size of the HARQ- ACK, the PUCCH resource set corresponding to the payload size of the HARQ-ACK. After the terminal device determines, based on the ARI field, one PUCCH resource or one PUCCH resource subset in the PUCCH resource set corresponding to the payload size of the HARQ-ACK as the fourth PUCCH resource, and further determines, based on a PUCCH start symbol, a PUCCH end symbol, or a PUCCH start symbol and a PUCCH end symbol corresponding to the fourth PUCCH resource, that the fourth PUCCH resource and the second PUCCH resource partially overlap in terms of time, the terminal device determines the total payload size based on the payload size of the CSI and the payload size of the HARQ-ACK, determines, based on the total payload size, the PUCCH resource set corresponding to the total payload size, and determines a PUCCH resource in the PUCCH resource set corresponding to the total payload size as the first PUCCH resource based on the ARI field.

In a possible design, a start symbol of the first PUCCH resource is the same as the start symbol of the fourth PUCCH resource, or an end symbol of the first PUCCH resource is the same as the end symbol of the fourth PUCCH resource. For example, the start symbol of the first PUCCH resource is the same as the start symbol of the fourth PUCCH resource, and the end symbol of the first PUCCH resource is the same as the end symbol of the fourth PUCCH resource.

It should be understood that the first PUCCH resource may not have an overlapping relationship with another PUCCH resource, or may be in another possible overlapping relationship. This is not limited in this application.

In addition, the first information can further indicate a PUCCH format used to transmit the HARQ-ACK. For details, refer to the specific description in the embodiment shown in FIG. 5. The details are not described herein again.

Figure 10:
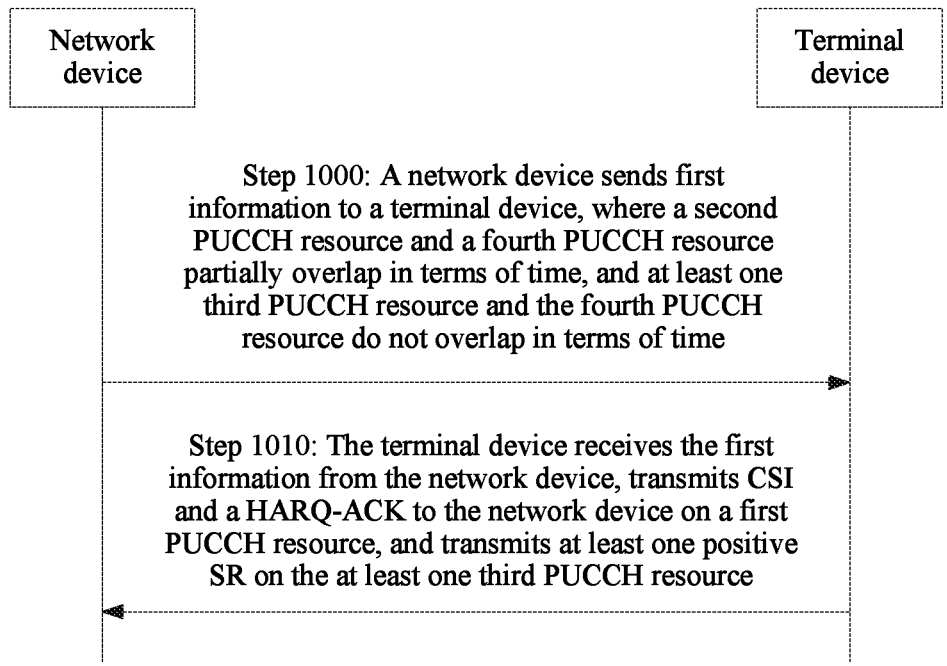
FIG. 10 is an overview flowchart 6 of an uplink control information sending and receiving method according to an embodiment of this application.

As shown in FIG. 10, an embodiment of this application further provides an uplink control information sending and receiving method, to enable a network device to schedule reporting of a plurality of pieces of UCI on a same resource. The method includes the following steps.

Step 1000: The network device sends first information, where the first information indicates a first PUCCH resource, the first PUCCH resource is used to transmit a HARQ-ACK, and the first information includes an ARI field.

The first PUCCH resource is determined based on a total payload size and the ARI field, and the total payload size is a sum of a payload size of CSI and a payload size of the HARQ-ACK. A fourth PUCCH resource is determined based on the payload size of the HARQ-ACK and the ARI field. The first PUCCH resource belongs to a first PUCCH resource set, and the fourth PUCCH resource belongs to a second PUCCH resource set.

It should be understood that in this embodiment of this application, the network device configures at least two PUCCH resource sets for a terminal device, the first PUCCH resource set is different from the second PUCCH resource set, a PUCCH resource set corresponding to the total payload size is the first PUCCH resource set, and a PUCCH resource set corresponding to the payload size of the HARQ-ACK is the second PUCCH resource set.

A second PUCCH resource and the fourth PUCCH resource partially overlap in terms of time, and at least one third PUCCH resource and the fourth PUCCH resource do not overlap in terms of time. The second PUCCH resource is used to transmit the CSI, the at least one third PUCCH resource is used to transmit at least one positive SR, and one third PUCCH resource in the at least one third PUCCH resource is used to transmit one positive SR.

It should be understood that an overlapping relationship between the fourth PUCCH resource and other PUCCH resources is the same as that in the scenario corresponding to the embodiment shown in FIG. 5, and repeated parts are not described again.

Step 1010: The terminal device receives the first information from the network device, transmits the HARQ-ACK and the CSI to the network device on the first PUCCH resource, and transmits the at least one positive SR on the at least one third PUCCH resource.

After receiving the first information, the terminal device first determines, based on the payload size of the HARQ-ACK, the PUCCH resource set corresponding to the payload size of the HARQ-ACK. After the terminal device determines, based on the ARI field, one PUCCH resource or one PUCCH resource subset in the PUCCH resource set corresponding to the payload size of the HARQ-ACK as the fourth PUCCH resource, and further determines, based on a PUCCH start symbol, a PUCCH end symbol, or a PUCCH start symbol and a PUCCH end symbol corresponding to the fourth PUCCH resource, that the second PUCCH resource and the fourth PUCCH resource partially overlap in terms of time and the at least one third PUCCH resource and the fourth PUCCH resource do not overlap in terms of time, the terminal determines the total payload size based on the payload size of the CSI and the payload size of the HARQ-ACK, determines, based on the total payload size, the PUCCH resource set corresponding to the total payload size, and determines a PUCCH resource in the PUCCH resource set corresponding to the total payload size as the first PUCCH resource based on the ARI field.

In a possible design, a start symbol of the first PUCCH resource is the same as the start symbol of the fourth PUCCH resource, or an end symbol of the first PUCCH resource is the same as the end symbol of the fourth PUCCH resource. For example, the start symbol of the first PUCCH resource is the same as the start symbol of the fourth PUCCH resource, and the end symbol of the first PUCCH resource is the same as the end symbol of the fourth PUCCH resource.

It should be understood that the first PUCCH resource may not have an overlapping relationship with PUCCH resources, or may be in another possible overlapping relationship. This is not limited in this application.

In addition, the first information can further indicate a PUCCH format used to transmit the HARQ-ACK. For details, refer to the specific description in the embodiment shown in FIG. 5. A specific explanation of transmitting, by the terminal device, the at least one positive SR on the at least one third PUCCH resource is also the same as the specific description in the embodiment shown in FIG. 5. Details are not described herein again.

Figure 11:
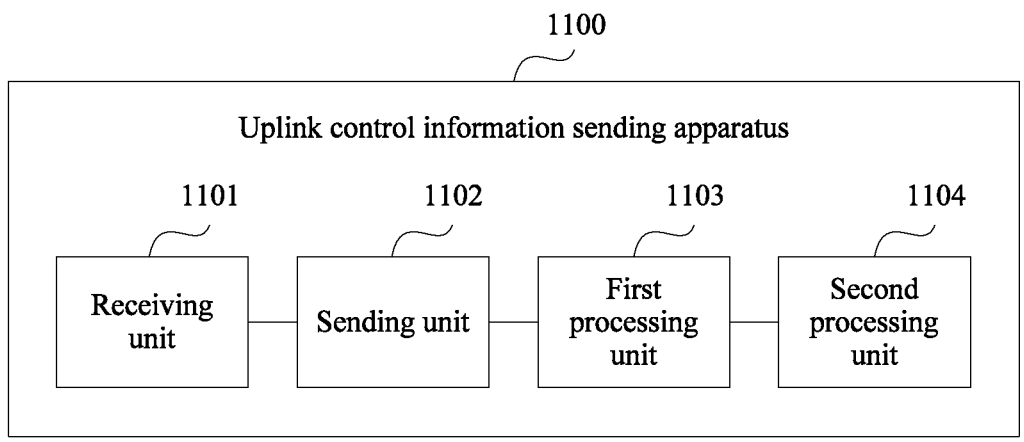
FIG. 11 is a schematic structural diagram of an uplink control information sending apparatus according to an embodiment of this application.

Based on the foregoing embodiments, an embodiment of this application provides an uplink control information sending apparatus. As shown in FIG. 11, the apparatus 1100 includes:

a receiving unit 1101, configured to receive first information from a network device, where the first information indicates a first uplink control channel PUCCH resource, and the first PUCCH resource is used to transmit a hybrid automatic repeat request acknowledgment HARQ-ACK, where a second PUCCH resource and the first PUCCH resource partially overlap in terms of time; or a second PUCCH resource and the first PUCCH resource do not overlap in terms of time, and any third PUCCH resource in at least one third PUCCH resource respectively partially overlaps the first PUCCH resource and the second PUCCH resource in terms of time; where the second PUCCH resource is used to transmit channel state information CSI, the at least one third PUCCH resource is used to transmit at least one positive scheduling request SR, and one third PUCCH resource in the at least one third PUCCH resource is used to transmit one positive SR; and a sending unit 1102, configured to transmit at least one SR status, the CSI, and the HARQ-ACK to a network device on the first PUCCH resource, where the SR status is a positive SR or a negative SR.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2; and the apparatus 1100 further includes a first processing unit 1103, configured to jointly encode the at least one SR status, the CSI, and the HARQ-ACK before the at least one SR status, the CSI, and the HARQ-ACK are transmitted.

In a possible design, the first information further indicates that a PUCCH format used to transmit the HARQ-ACK is PUCCH format 3 or PUCCH format 4; and the apparatus 1100 further includes a first processing unit 1103, configured to: before the at least one SR status, the CSI, and the HARQ-ACK are transmitted, jointly encode the at least one SR status, the HARQ-ACK, and a first part CSI part 1 in the CSI, and independently encode a second part CSI part 2 in the CSI.

In a possible design, when a quantity of the at least one third PUCCH resource is K, where K is an integer greater than or equal to 2, a quantity of bits occupied by the at least one SR status is $\lceil \log_2(K+1) \rceil$.

In a possible design, the first information includes an acknowledgment resource indicator ARI field; and the apparatus 1100 further includes a second processing unit 1104, configured to: before the at least one SR status, the CSI, and the HARQ-ACK are transmitted, determine a total payload size based on a payload size of the at least one SR status, a payload size of the CSI, and a payload size of the HARQ-ACK; and determine, based on the total payload size, a PUCCH resource set corresponding to the total payload size, and determine a PUCCH resource in the PUCCH resource set as the first PUCCH resource based on the ARI field.

It may be understood that for specific implementations of the functional modules included by the uplink control information sending apparatus in FIG. 11 and corresponding beneficial effects, refer to the specific description of the foregoing embodiment shown in FIG. 2. Details are not described herein again.

In another optional variation, an embodiment of this application provides an uplink control information sending apparatus. For example, the apparatus may be a chip, and the apparatus includes a processor and an interface. The processor implements functions of the first processing unit 1103 and the second processing unit 1104, and the interface implements functions of the receiving unit 1101 and the sending unit 1102. The apparatus may further include a memory, and the memory is configured to store a program that may run on the processor. The processor implements the methods in the foregoing embodiments when executing the program.

Figure 12:
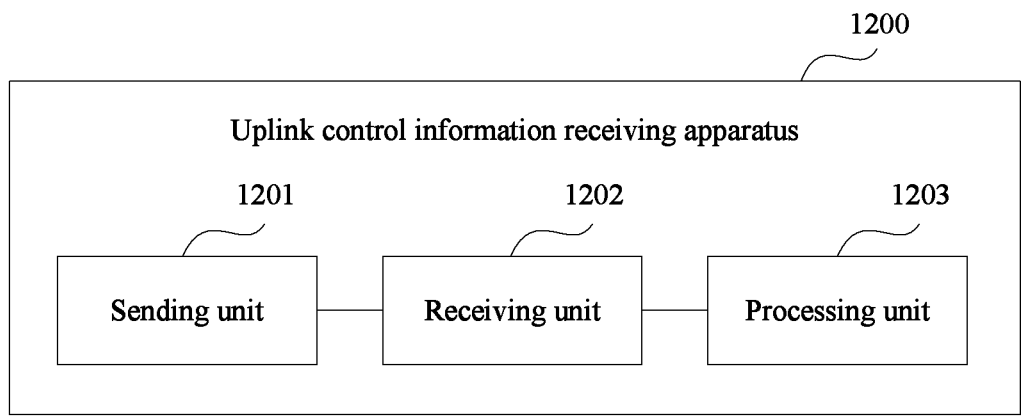
FIG. 12 is a schematic structural diagram of an uplink control information receiving apparatus according to an embodiment of this application.

Based on the foregoing embodiments, an embodiment of this application provides an uplink control information receiving apparatus. As shown in FIG. 12, the apparatus 1200 includes:

a sending unit 1201, configured to send first information to a terminal device, where the first information indicates a first PUCCH resource, and the first PUCCH resource is used to transmit a HARQ-ACK; where a second PUCCH resource and the first PUCCH resource partially overlap in terms of time; or a second PUCCH resource and the first PUCCH resource do not overlap in terms of time, and any third PUCCH resource in at least one third PUCCH resource respectively partially overlaps the first PUCCH resource and the second PUCCH resource in terms of time; where the at least one third PUCCH resource is used to transmit at least one positive SR, and one third PUCCH resource in the at least one third PUCCH resource is used to transmit one positive SR; and a receiving unit 1202, configured to receive, on the first PUCCH resource, at least one SR status, the CSI, and the HARQ-ACK that are transmitted by the terminal device, where the SR status is a positive SR or a negative SR.

In a possible design, the second PUCCH resource is a PUCCH resource used to transmit one piece of periodic CSI, or is a PUCCH resource used to transmit a plurality of pieces of periodic CSI.

In a possible design, the first information further indicates that a PUCCH format used to transmit the HARQ-ACK is PUCCH format 2, PUCCH format 3, or PUCCH format 4.

In a possible design, when a quantity of the at least one third PUCCH resource is K, where K is an integer greater than or equal to 2, a quantity of bits occupied by the at least one SR status is $\lceil \log_2(K+1) \rceil$.

In a possible design, the apparatus 1200 further includes:

a processing unit 1203, configured to: determine a total payload size based on a payload size of the at least one SR status, a payload size of the CSI, and a payload size of the HARQ-ACK;

determine, based on the total payload size, a PUCCH resource set corresponding to the total payload size; and select a PUCCH resource from the PUCCH resource set as the first PUCCH resource.

The sending unit 1201 is specifically configured to send the first information to the terminal device, where the first information includes an ARI field, and the ARI field is an ARI field corresponding to the selected PUCCH resource.

It should be understood that division of the foregoing units is merely logical function division. During actual implementation, all or some of the units may be integrated into one physical entity, or may be physically separated. In addition, these units may be all implemented by software through invoking of a processing element, or may be all implemented in a form of hardware; or some units may be implemented by software through invoking of a processing element, and other units are implemented in a form of hardware. In an implementation process, steps in the foregoing methods or the foregoing units can be implemented by using a hardware integrated logical circuit in the processing element, or by using instructions in a form of software.

For example, the foregoing units may be one or more integrated circuits configured to implement the foregoing methods, for example, one or more application-specific integrated circuits (ASIC), one or more microprocessors (for example, digital signal processor (DSP)), or one or more field programmable gate arrays (FPGA). For another example, when one of the foregoing units is implemented by a processing element through invoking a program, the processing element may be a general-purpose processor, for example, a central processing unit (CPU) or another processor that can invoke the program. For another example, these units may be integrated and implemented in a form of a system-on-a-chip (SOC).

Figure 13:
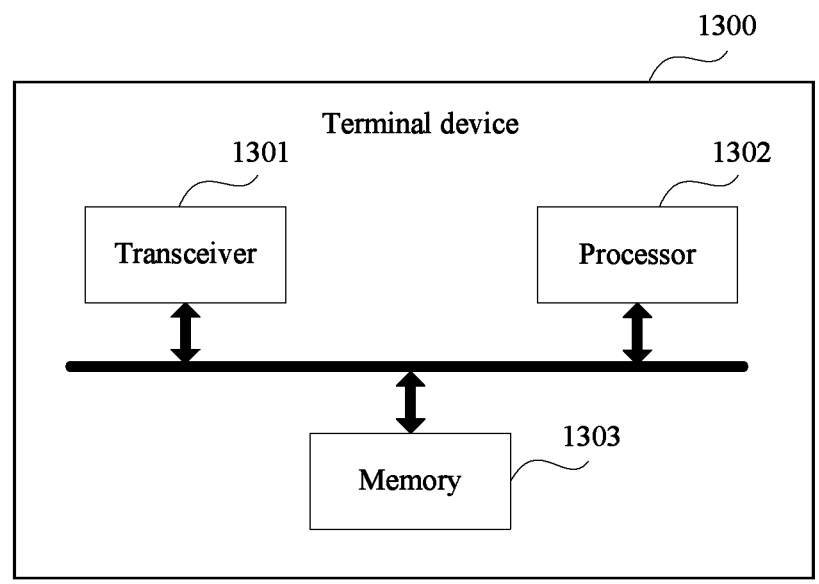
FIG. 13 is a schematic structural diagram of a terminal device according to an embodiment of this application.

Based on the foregoing embodiments, an embodiment of this application further provides a terminal device. As shown in FIG. 13, the terminal device 1300 includes a transceiver 1301, a processor 1302, and a memory 1303. The memory 1303 is configured to store a computer program. The processor 1302 invokes the computer program stored in the memory 1303 to perform the methods shown in FIG. 2, FIG. 5, FIG. 7, FIG. 8, FIG. 9, and FIG. 10 by using the transceiver 1301.

It may be understood that the apparatus in the embodiment shown in FIG. 11 may be implemented by the terminal device 1300 shown in FIG. 13. Specifically, the first processing unit 1103 and the second processing unit 1104 may be implemented by the processor 1302, and the receiving unit 1101 and the sending unit 1102 may be implemented by the transceiver 1301. A structure of the terminal device 1300 does not limit this embodiment of this application.

Figure 14:
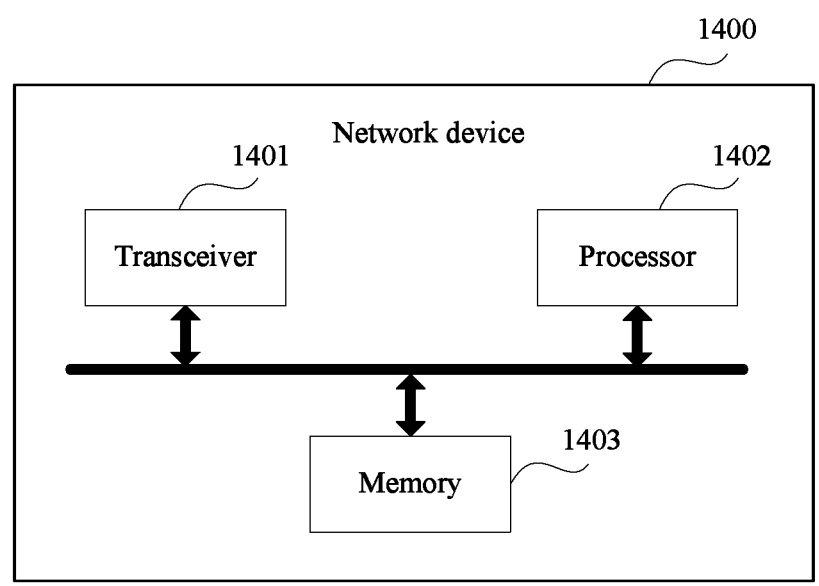
FIG. 14 is a schematic structural diagram of a network device according to an embodiment of this application.

Based on the foregoing embodiments, an embodiment of this application further provides a network device. As shown in FIG. 14, the network device 1400 includes a transceiver 1401, a processor 1402, and a memory 1403. The memory 1403 is configured to store a computer program. The processor 1402 invokes the computer program stored in the memory 1403 to perform the methods shown in FIG. 2, FIG. 5, FIG. 7, FIG. 8, FIG. 9, and FIG. 10 by using the transceiver 1401.

It may be understood that the apparatus in the embodiment shown in FIG. 12 may be implemented by the network device 1400 shown in FIG. 14. Specifically, the sending unit 1201 and the receiving unit 1202 may be implemented by the transceiver 1401, and the processing unit 1203 may be implemented by the processor 1402. A structure of the network device 1400 does not limit this embodiment of this application.

In FIG. 13 and FIG. 14, the processor may be a CPU, a network processor (NP), a hardware chip, or any combination thereof. The memory may include a volatile memory, for example, a random access memory (RAM); or the memory may include a non-volatile memory, for example, a read-only memory (ROM), a flash memory, a hard disk drive (HDD), or a solid-state drive (SSD); or the memory may include a combination of the foregoing types of memories.

In conclusion, according to the methods provided in the embodiments of this application, a problem of how to send three different types of UCI when OFDM symbols occupied by the three different types of UCI in a same slot partially overlap can be resolved, so that a single-carrier characteristic of uplink sending of the terminal device can be kept, and it is ensured that the UCI can be correctly received by the network device.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including, but not limited to, a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A method, wherein the method comprises:
receiving, by an apparatus, first information through downlink scheduling signaling from a network device, wherein the first information comprises a resource indicator;
determining, by the apparatus based on the resource indicator, a first physical uplink control channel (PUCCH) resource in a first PUCCH resource set corresponding to a payload size of a hybrid automatic repeat request acknowledgment (HARQ-ACK);
in response to determining, by the apparatus, that the first PUCCH resource and a second PUCCH resource partially overlap in terms of time or determining, by the apparatus, that the first PUCCH resource and a second PUCCH resource do not overlap in terms of time, and the first PUCCH resource and the second PUCCH resource each partially overlap a same third PUCCH resource in at least one third PUCCH resource in terms of time, determining, by the apparatus based on the resource indicator, a fourth PUCCH resource in a second PUCCH resource set corresponding to a total payload size, wherein the total payload size comprises a payload size of at least one scheduling request (SR)

status corresponding to the at least one third PUCCH resource, a payload size of the channel state information (CSI), and the payload size of the HARQ-ACK, wherein the second PUCCH resource is configured for CSI, and the at least one third PUCCH resource is configured for at least one SR; and sending, by the apparatus, the HARQ-ACK, the CSI, and the at least one SR status to the network device on the fourth PUCCH resource.

2. The method according to claim 1, wherein the second PUCCH resource is configured for periodic CSI.

3. The method according to claim 1, wherein a quantity of the at least one third PUCCH resource is K, K is an integer greater than or equal to 2, and a quantity of bits occupied by the at least one SR status is $\lceil \log_2(K+1) \rceil$.

4. The method according to claim 1, wherein a quantity of the at least one third PUCCH resource is 1.

5. The method according to claim 1, further comprising:
receiving, by the apparatus, radio resource control signaling, wherein the radio resource control signaling comprises information about the second PUCCH resource.

6. The method according to claim 1, further comprising:
receiving, by the apparatus, radio resource control signaling, wherein the radio resource control signaling comprises information about the at least one third PUCCH resource.

7. The method according to claim 1, wherein the HARQ-ACK, the CSI, and the at least one SR status are sent on the fourth PUCCH resource by using PUCCH format 2, PUCCH format 3, or PUCCH format 4.

8. An apparatus, comprises a processor and a storage medium, the storage medium stores an instruction, and when the instruction is run by the processor, the apparatus is enabled to perform:
receiving first information through downlink scheduling signaling, wherein the first information comprises a resource indicator;
determining, based on the resource indicator, a first physical uplink control channel (PUCCH) resource in a first PUCCH resource set corresponding to a payload size of a hybrid automatic repeat request acknowledgment (HARQ-ACK);
in response to determining that the first PUCCH resource and a second PUCCH resource partially overlap in terms of time or determining, by the apparatus, that the first PUCCH resource and a second PUCCH resource do not overlap in terms of time, and the first PUCCH resource and the second PUCCH resource each partially overlap a same third PUCCH resource in at least one third PUCCH resource in terms of time, determining, based on the resource indicator, a fourth PUCCH resource in a second PUCCH resource set corresponding to a total payload size, wherein the total payload size comprises a payload size of at least one scheduling request (SR) status corresponding to the at least one third PUCCH resource, a payload size of the channel state information (CSI), and the payload size of the HARQ-ACK, wherein the second PUCCH resource is configured for CSI, and the at least one third PUCCH resource is configured for at least one SR; and
sending the HARQ-ACK, the CSI, and the at least one SR status on the fourth PUCCH resource.

9. The apparatus according to claim 8, wherein the second PUCCH resource is configured for periodic CSI.

10. The apparatus according to claim 8, wherein a quantity of the at least one third PUCCH resource is K, K is an integer greater than or equal to 2, and a quantity of bits occupied by the at least one SR status is $\lceil \log_2(K+1) \rceil$.

11. The apparatus according to claim 8, wherein a quantity of the at least one third PUCCH resource is 1.

12. The apparatus according to claim 8, wherein when the instruction is run by the processor, the apparatus is enabled to further perform:
receiving radio resource control signaling, wherein the radio resource control signaling comprises information about the second PUCCH resource.

13. The apparatus according to claim 8, wherein when the instruction is run by the processor, the apparatus is enabled to further perform:
receiving radio resource control signaling, wherein the radio resource control signaling comprises information about the at least one third PUCCH resource.

14. The apparatus according to claim 8, wherein the HARQ-ACK, the CSI, and the at least one SR status are sent on the fourth PUCCH resource by using PUCCH format 2, PUCCH format 3, or PUCCH format 4.

15. A non-transitory computer-readable storage medium comprising instructions which, when executed by a computer, cause the computer to carry out the steps of:
receiving first information through downlink scheduling signaling, wherein the first information comprises a resource indicator;
determining, based on the resource indicator, a first physical uplink control channel (PUCCH) resource in a first PUCCH resource set corresponding to a payload size of a hybrid automatic repeat request acknowledgment (HARQ-ACK);
in response to determining that the first PUCCH resource and a second PUCCH resource partially overlap in terms of time or determining, by the apparatus, that the first PUCCH resource and a second PUCCH resource do not overlap in terms of time, and the first PUCCH resource and the second PUCCH resource each partially overlap a same third PUCCH resource in at least one third PUCCH resource in terms of time, determining, based on the resource indicator, a fourth PUCCH resource in a second PUCCH resource set corresponding to a total payload size, wherein the total payload size comprises a payload size of at least one scheduling request (SR) status corresponding to the at least one third PUCCH resource, a payload size of the channel state information (CSI), and the payload size of the HARQ-ACK, wherein the second PUCCH resource is configured for CSI, and the at least one third PUCCH resource is configured for at least one SR; and
sending the HARQ-ACK, the CSI, and the at least one SR status on the fourth PUCCH resource.

16. The non-transitory computer-readable storage medium according to claim 15, wherein the second PUCCH resource is configured for periodic CSI.

17. The non-transitory computer-readable storage medium according to claim 15, wherein a quantity of the at least one third PUCCH resource is K, K is an integer greater than or equal to 2, and a quantity of bits occupied by the at least one SR status is $\lceil \log_2(K+1) \rceil$.

18. The non-transitory computer-readable storage medium according to claim 15, wherein a quantity of the at least one third PUCCH resource is 1.

19. The non-transitory computer-readable storage medium according to claim 15, wherein the instructions which, when executed by a computer, further cause the computer to carry out the steps of:

receiving radio resource control signaling, wherein the radio resource control signaling comprises information about the second PUCCH resource.

20. The non-transitory computer-readable storage medium according to claim 15, wherein the instructions which, when executed by a computer, further cause the computer to carry out the steps of:
receiving radio resource control signaling, wherein the radio resource control signaling comprises information about the at least one third PUCCH resource.

21. The non-transitory computer-readable storage medium according to claim 15, wherein the HARQ-ACK, the CSI, and the at least one SR status are sent on the fourth PUCCH resource by using PUCCH format 2, PUCCH format 3, or PUCCH format 4.

* * * * *